(12) United States Patent
Roskowski et al.

(10) Patent No.: US 7,844,670 B2
(45) Date of Patent: Nov. 30, 2010

(54) METHOD AND COMPUTER PROGRAM PRODUCT FOR ESTABLISHING REAL-TIME COMMUNICATIONS BETWEEN NETWORKED COMPUTERS

(75) Inventors: Steven G. Roskowski, San Jose, CA (US); Andrew D. Riedel, Belmont, CA (US)

(73) Assignee: PalTalk Holdings, Inc., New York, NY (US)

( * ) Notice: Subject to any disclaimer, the term of this patent is extended or adjusted under 35 U.S.C. 154(b) by 0 days.

(21) Appl. No.: 10/991,335

(22) Filed: Nov. 17, 2004

(65) Prior Publication Data

US 2005/0198167 A1    Sep. 8, 2005

Related U.S. Application Data

(63) Continuation of application No. 09/542,090, filed on Apr. 3, 2000, now abandoned.

(51) Int. Cl.
  G06F 15/16    (2006.01)
  G06F 3/00     (2006.01)
(52) U.S. Cl. .................. 709/206; 709/227; 709/228; 709/231; 715/751; 715/752; 715/753; 715/758
(58) Field of Classification Search .......... 709/206, 709/207, 218, 227, 228, 231; 715/733, 751–753, 715/758; 379/202.01
See application file for complete search history.

(56) References Cited

U.S. PATENT DOCUMENTS

| | | | | |
|---|---|---|---|---|
| 5,471,318 A * | 11/1995 | Ahuja et al. | ................. | 358/400 |
| 5,724,508 A * | 3/1998 | Harple et al. | ................. | 709/205 |
| 5,764,916 A * | 6/1998 | Busey et al. | ................. | 709/227 |
| 5,828,839 A * | 10/1998 | Moncreiff | ................. | 709/204 |
| 6,016,478 A * | 1/2000 | Zhang et al. | ................. | 705/9 |
| 6,161,137 A * | 12/2000 | Ogdon et al. | ................. | 709/224 |
| 6,212,548 B1 * | 4/2001 | DeSimone et al. | ................. | 709/206 |
| 6,223,213 B1 * | 4/2001 | Cleron et al. | ................. | 709/206 |
| 6,252,588 B1 * | 6/2001 | Dawson | ................. | 715/752 |
| 6,275,490 B1 * | 8/2001 | Mattaway et al. | ................. | 370/352 |
| 6,295,551 B1 * | 9/2001 | Roberts et al. | ................. | 709/205 |
| 6,297,819 B1 * | 10/2001 | Furst | ................. | 715/733 |
| 6,330,719 B1 * | 12/2001 | Zigmond et al. | ................. | 725/121 |
| 6,433,795 B1 * | 8/2002 | MacNaughton et al. | ................. | 715/738 |
| 6,484,196 B1 * | 11/2002 | Maurille | ................. | 709/206 |
| 6,487,583 B1 * | 11/2002 | Harvey et al. | ................. | 709/204 |
| 6,487,585 B1 * | 11/2002 | Yurkovic | ................. | 709/206 |
| 6,522,333 B1 * | 2/2003 | Hatlelid et al. | ................. | 345/474 |
| 6,549,612 B2 * | 4/2003 | Gifford et al. | ................. | 379/67.1 |

(Continued)

*Primary Examiner*—Ario Etienne
*Assistant Examiner*—Gregory G. Todd
(74) *Attorney, Agent, or Firm*—Ward & Olivo

(57) ABSTRACT

A system, method, and computer program product is provided for establishing real-time communications between computer users connected by a communications network. An invitation is created by a first computer. An invitation is data that proposes a communication session. An invitation can indicate the status or availability of the sending user or of some other resource. Creation of the invitation is followed by the transfer of the invitation from the first computer to at least one second computer. The invitation can be transferred electronically through the network, or physically, by the transfer of a magnetic medium bearing the invitation. The invitation contains parameters to configure an invitation communicator application for communications between the first and second computers. The second computer accepts the invitation and invokes an invitation communicator application to allow communication.

36 Claims, 17 Drawing Sheets

U.S. PATENT DOCUMENTS

| | | | |
|---|---|---|---|
| 6,594,693 B1* | 7/2003 | Borwankar | 709/204 |
| 6,598,075 B1* | 7/2003 | Ogdon et al. | 709/204 |
| 6,604,129 B2* | 8/2003 | Slutsman et al. | 709/204 |
| 6,650,761 B1* | 11/2003 | Rodriguez et al. | 382/100 |
| 6,784,899 B1* | 8/2004 | Barrus et al. | 715/717 |
| 6,807,562 B1* | 10/2004 | Pennock et al. | 709/204 |
| 7,136,062 B1* | 11/2006 | Butler | 345/422 |
| 7,136,903 B1* | 11/2006 | Phillips et al. | 709/217 |
| 7,152,093 B2* | 12/2006 | Ludwig et al. | 709/204 |
| 7,171,386 B1* | 1/2007 | Raykhman | 705/37 |
| 2001/0034689 A1* | 10/2001 | Heilman, Jr. | 705/37 |
| 2001/0048449 A1* | 12/2001 | Baker | 345/758 |
| 2002/0002586 A1* | 1/2002 | Rafal et al. | 709/205 |
| 2002/0023132 A1* | 2/2002 | Tornabene et al. | 709/205 |
| 2002/0056119 A1* | 5/2002 | Moynihan | 725/87 |
| 2005/0181878 A1* | 8/2005 | Danieli et al. | 463/42 |

\* cited by examiner

METHOD AND COMPUTER PROGRAM PRODUCT FOR ESTABLISHING REAL-TIME COMMUNICATIONS BETWEEN NETWORKED COMPUTERS

CROSS REFERENCE TO RELATED APPLICATIONS

This application is a continuation of application Ser. No. 09/542,090, filed Apr. 3, 2000, now abandoned.

BACKGROUND OF THE INVENTION

1. Field of the Invention

The invention described herein relates to communications between computer users.

2. Related Art

With current communication technologies, people often attempt to communicate with others in a blind manner. The initiator does not know if the intended contact is currently present at the contact's usual location, or whether the contact is available to communicate. To compound matters, the initiator often must leave a message that the intended contact receives at some later point. The contact now becomes the initiator and the whole scenario repeats itself. In the telephone medium, this is known as "phone tag." This problem is compounded when a multi-participant conference needs to be established. Typically, a cumbersome coordination process must occur where all intended participants are first contacted to make sure they are available for a certain time slot. If the coordinator gets half way through the list of participants only to find that the designated time slot does not work, the whole process must be restarted.

In recent years, buddy list applications have appeared which provide presence information about one's contacts. With these applications, it is easy to determine whether a contact (or buddy) is currently online or perhaps away from their desk. It also provides the ability to decide whether to establish contact "on the spot" via an instant message. There are several limitations to current buddy list applications. Most notably, segmentation of the namespace has occurred with buddy list applications due to a lack of standards and marketing battles between service providers. This prevents people from having global access to everyone connected to the Internet. Instead, a user is limited to users of the same buddy list application. Further, these applications tend to be large in size, require a separate download and installation process, and do not allow users to selectively manage their availability to people, meetings, and events.

SUMMARY OF THE INVENTION

The invention described herein is a system, method, and computer program product for establishing real-time communications between computer users connected by a communications network. The invention provides for the creation, by a first computer, of an invitation. The invitation is data that proposes a communication session. The invitation can indicate the status or availability of the sending user or of some other resource. Creation of the invitation is followed by the transfer of the invitation from the first computer to at least one second computer. The invitation can be transferred electronically through the network, or physically, by the transfer of a data storage medium bearing the invitation. The invitation contains parameters to configure an invitation communicator application for communications between the first and second computers. The second computer accepts the invitation and invokes an invitation communicator application to allow communication.

The use of invitations is independent of a service provider, so that a sending user can send an invitation to anyone else with whom the sending user is networked. Invitations allows the sending user to manage and state the sending user's availability to people, meetings, and events. An invitation can serve to state that the sending user is ready and able to communicate presently, or at a designated time. Accepting an invitation can therefore give a receiving user instant communications access to the sending user. Sending an invitation to several receiving users can create the equivalent of a chat room.

BRIEF DESCRIPTION OF THE FIGURES

The foregoing and other features and advantages of the invention will be apparent from the following, more particular description of a preferred embodiment of the invention, as illustrated in the accompanying drawings.

DETAILED DESCRIPTION OF THE PREFERRED EMBODIMENTS

Figure 1:
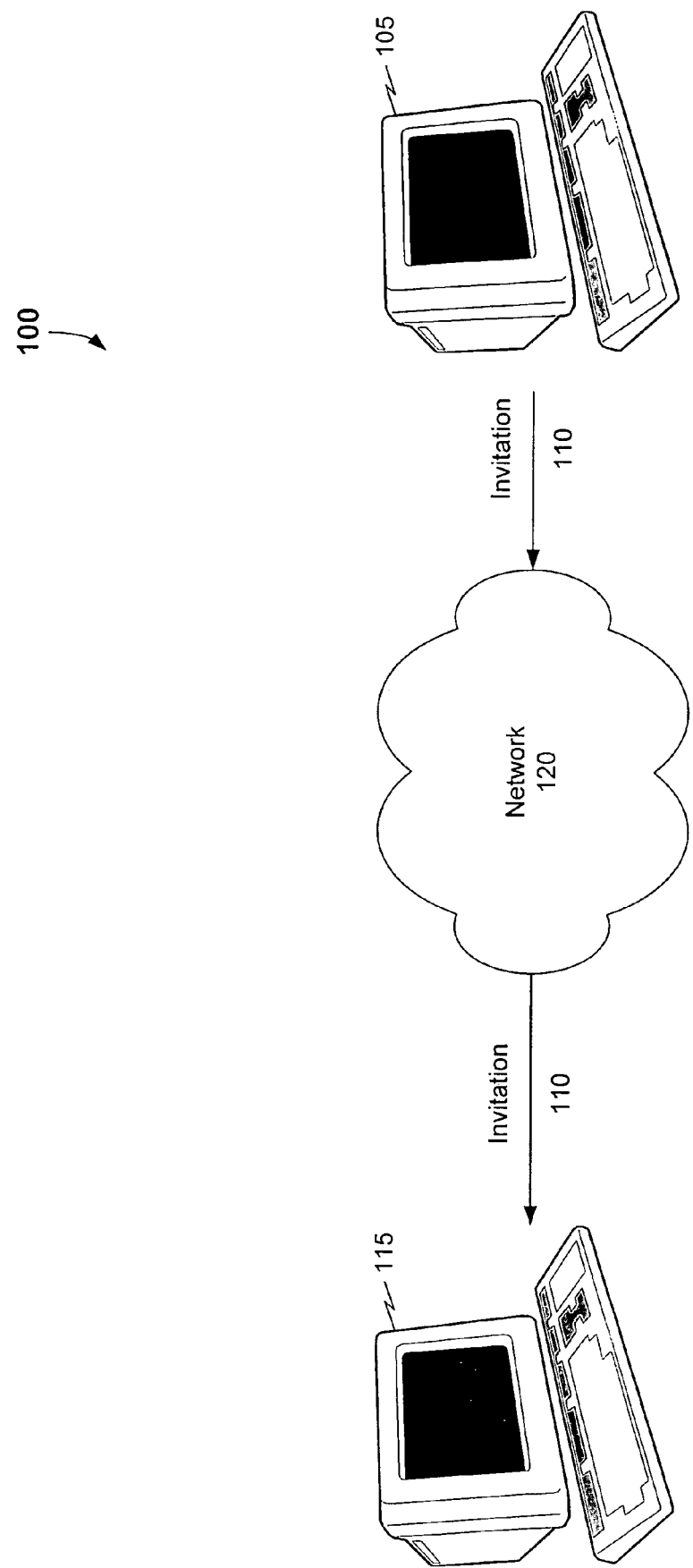
FIG. 1 illustrates the transfer of an invitation between two networked computers.

A preferred embodiment of the present invention is now described with reference to the figures where like reference numbers indicate identical or functionally similar elements. Also in the figures, the left most digit of each reference number corresponds to the figure in which the reference number is first used. While specific configurations and arrangements are discussed, it should be understood that this is done for illustrative purposes only. A person skilled in the relevant art will recognize that other configurations and arrangements can be used without departing from the spirit and scope of the invention. It will be apparent to a person skilled in the relevant art that this invention can also be employed in a variety of other devices and applications.

Overview

The invention described herein is a system, method, and computer program product for sending, receiving, and managing invitations. An invitation is a representation of a sending user. An invitation is capable of establishing a communications channel to allow real-time interaction between the sending user and one or more receiving users while providing presence and availability information about the sending user and the receivers. Invitations effectively propose real time communications between parties and permit the real time sharing of status information among parties. An invitation can therefore serve to tell receiving users that the sending party is ready and able to communicate, and vice versa. Examples of such real time communications include text interchanges, such as the interchanges seen in chat room applications, or real time voice interchanges.

Invitations provide presence and availability information about the participants that are to communicate. This information is dynamically communicated so that changes in presence or availability of a participant can be immediately seen by others. When a user interacts with an invitation, a real-time communication session such as text chat or voice chat can be initiated.

Applications for invitations include on-line auctions or other buying processes. Invitations can be particularly useful when the item being bought may have limited availability, such as tickets to an event, where status information (e.g., item availability, or duration of a sale) must be conveyed to a prospective buyer. An invitation can also be used to propose a conference, in which case the information can contain information such as a conference address and program. By providing real-time interaction with presence and availability, invitations can enable applications to provide major productivity gains.

In an embodiment of the invention, an invitation can be sent from one party to another via a computer network, such as the Internet. Electronic mail can be used as the vehicle for transferring an invitation from one party to another. In an embodiment of the invention, a sender can save copies of outgoing invitations, and can categorize and display them in a manner related to their attributes, as defined by the sender. The sender may, for example, choose to organize copies of outgoing invitations according to recipient. The receiver can likewise save, categorize, and display received invitations. Ultimately, parties can invoke the communications application and launch it. This allows them to engage in real time communications with the sender.

System

The system of the present invention is illustrated in a general manner in FIG. 1 as system 100. A user at a sending computer 105 sends an invitation 110 to a data network 120. The invitation 110 is a proposal to communicate and is a reference to a real time communications application. More formally, invitation 110 is a data representation of an entity capable of establishing a communications channel to allow real-time interaction between two or more participants while providing presence and availability information about the participants. In an embodiment of the invention, invitation 110 identifies the communications application. Invitation 110 is then forwarded by network 120 to a receiving computer 115, where it can be accessed by a receiving user. Note that in some uses of the invention, an invitation can be sent from a sending computer to more than one receiving computer. The invitation can be embedded in an e-mail, for example. In an alternative embodiment, the invitation is incorporated in an electronic document or some other electronic file, which is transferred to receiving computer 115. The transfer can be either electronic (e.g., through the internet 210) or physical (e.g., delivery of magnetic media). The embodiments described below deliver the invitation using e-mail. Note that sending computer 105 and receiving computers 105 and 115 can be either peer entities or in a server/client relationship.

Figure 2:
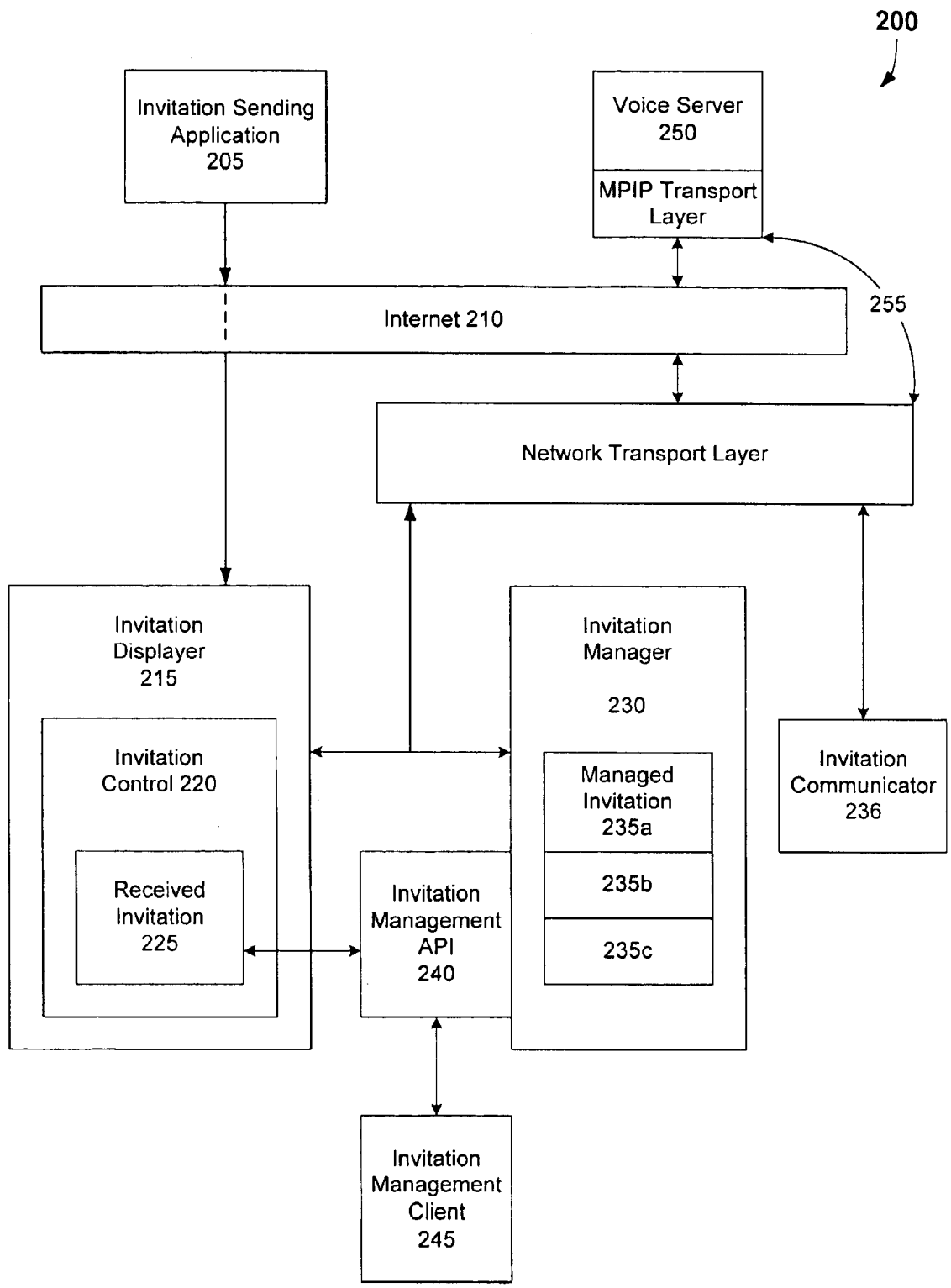
FIG. 2 illustrates a logical view of the architecture of an embodiment of the invention.

A logical perspective of system 100 is presented in FIG. 2. An invitation sending application 205 at a sending computer transmits an invitation to a computer network, such the Internet 210. In an embodiment of the invention, invitation sending application 205 is an e-mail program. The invitation is then sent to an invitation displayer 215 at a receiving computer. Invitation displayer 215 is an application containing a hypertext mark-up language (HTML) browser or other module capable of displaying an invitation control 220. Examples of an invitation displayer include HTML-capable e-mail browsers, Microsoft Word documents, and custom applications. The invitation control 220 is an object that can be obtained (downloaded) from a cooperating web server and then operates in conjunction with invitation displayer 215. Invitation control 220 provides a visual display of a received invitation 225.

Invitation control 220 also facilitates the download and installation of other components such as an invitation manager 230 and an invitation communicator 236. Invitation manager 230 is a module that manages a database of inbound (received) invitations and outbound invitations, tracks presence and state information of inbound invitations, and sends updated presence and state information of outbound invitations to users. Invitation manager 230 also updates other applications as necessary regarding any presence and state changes to the outbound or received invitations under its supervision. Such invitations are identified as managed invitations 235a, 235b, and 235c in FIG. 2.

An invitation management application program interface (API) 240 is an interface to the invitation manager 230 that provides an invitation management client 245 the ability to manage invitations and allows for other applications to be notified of changes in status of invitations under the supervision of the invitation manager 230. The invitation management client 245 is an application that utilizes the invitation management API 240 to provide a user interface for managing invitations.

Invitation communicator 236 is an application capable of being launched using information contained in invitation 225. Invitation communicator 236 facilitates communication between the participants. In an embodiment of the invention, such communication transpires via a voice server 250, which is accessible through internet 210. In an alternative embodiment, such communication takes place in a peer-to-peer mode. To accomplish such communication, a transport protocol may be required, such as the MPIP transport protocol 255, developed by HearMe of Mt. View, Calif.

Figure 3:
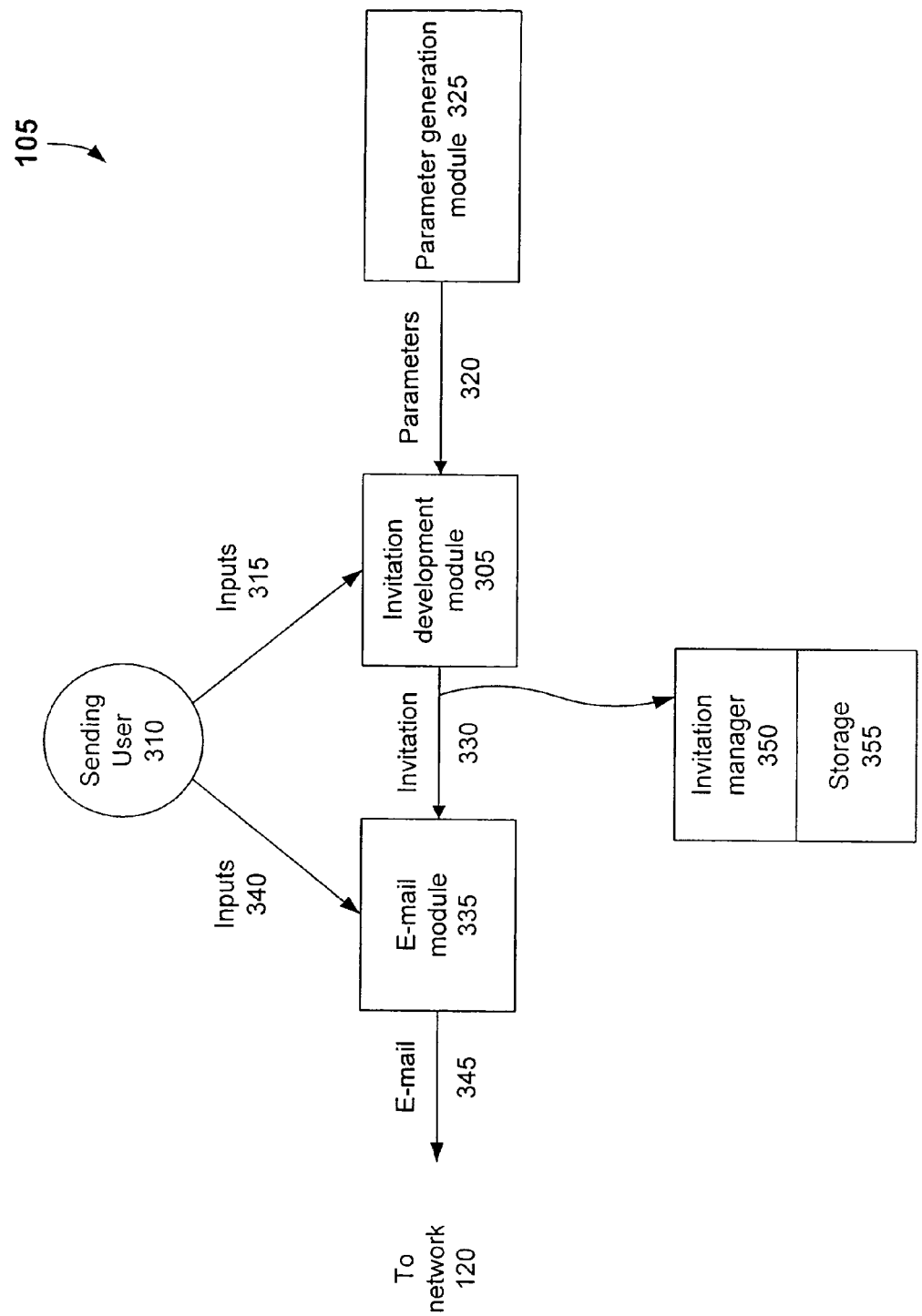
FIG. 3 is a block diagram illustrating the development and transmission of an e-mail containing an invitation, according to an embodiment of the invention.

The portion of the present invention incorporated at the sending computer 105 is illustrated in greater detail in FIG. 3. An invitation development module 305 accepts inputs 315 from a sending user 310. Examples of inputs 315 can include text that is to be presented to the receiving user through the invitation, and/or the time at which a communications channel is to be opened between the parties. Invitation development module 305 also receives parameters 320 produced by a parameter generation module 325. Parameters 320 include specifications for a communications context which must be passed to a user receiving the invitation. Parameters 320, for example, can include information which names a specific channel to be used during communications. Invitation development module 305 then produces an invitation 330, which serves as a reference to a communications session being proposed by the sending user 310. Invitation 330 can also be viewed as a representation of an entity (e.g., the sending user 310) capable of establishing a communications channel that allows real-time interaction between two or more participants (i.e., sending and receiving users) while providing presence and availability information about the participants. If invitation 330 is being used to establish a conference, invitation 330 can convey information such as a conference address and program. Invitation 330 is then sent to an e-mail program 335. E-mail program 335 can be a commercially available e-mail program, such as Eudora, by Qualcomm. E-mail program 335 also accepts inputs 340 from the sending user 310.

E-mail program 335 produces e-mail 345 containing the invitation 330. E-mail 245 is then sent to network 120. In an embodiment of the invention, the mail is transferred as full featured HTML. An example of such an e-mail is presented below. This code is presented by way of example, and is not intended as a limitation on embodiments of the invention:

```
<!DOCTYPE HTML PUBLIC "-//W3C/DTD HTML 4.0 Transitional//EN">
<html>
<head>
        <meta http-equiv="Content-Type" content="text/html; charset=iso-8859-1">
</head>
<body bgcolor="#DDDDDD">
<!-------------- BEGIN HearMe Now Device Parameters -------------->
<form name="HearMeVCC">
        <input type="hidden" name="Username" value="steve">
        <input type="hidden" name="Channel" value="#15506f56">
<!-------------- END HearMe Now Device Parameters -------------->
<!-------------- BEGIN HearMe Now Device Display -------------->
<table cellspacing=0 cellpadding=0 width=600>
<tr>
<td width=440 valign=top align=left>This is an example of email that has a text chat application
embedded inside of it.
<td width=160 valign=top align=center>
<script language="JavaScript"
        src="http://www.hearme.com/products/vp/embedded/scripts/vc.js">
</script>
<a href="http://mercury.hearme.com/mailform/fallback.cgi?rec=
        steve&cha=15506f56">
Launch browser voice chat about this</a>
</table>
</form>
<br><br>
Copyright 1999 HearMe. All rights reserved.
</body>
</html>
```

The java script "vc.js" can be written as follows:

```
/* (c)HearMe, 2000. All rights reserved. Modifications to and
reproduction
 * of this script is strictly forbidden without explicit written
permission
 * from HearMe. www.hearme.com
 */
if( navigator.userAgent.indexOf("WebTV") == -1 )
{
// ****************************************************************
// ******************** CONFIG VARIABLES ********************
// ****************************************************************
script_version = "x";
client_version = "1,2,1,4";
root = "http://vp.hearme.com";
evp_root = root + "/products/vp/embedded";
classid = "CLSID:73020B72-CDD6-4F80-8098-1B2ECD9CA4CA";
mimetype = "application/x-hearme-evp";
```

-continued

```
ie_url = evp_root + "/plugins/evp.cab#version=" + client_version;
ns_url = evp_root + "/plugins/evp.jar";
mic_url = root + "/products/vp/config/";
if (document.location.hash == "#evp2")
{
    script_version = "x";
    client_version = "2,0,1,0";
    classid = "CLSID:2B89A560-D118-4215-A90E-9CAEF818088C";
    ie_url = "";
    ns_url = "";
}
// ****************************************************************
// ****************** CODE STARTS HERE ************************
// ****************************************************************
var params = new Array(
"Domain","Vendor","Application","Deployment","Channel","Username",
"Talklimit","Width","Height","Background","Cookie","OptionsButton"
,"StatusArea",
"TalkButton","TextChatButton","TextChatWindow","UserList","VUMeter
",
"Border","Color","LogoImg","LogoURL","HelpURL" );
// ****************************************************************
// ****************** DEFAULT VALUES ***************************
// ****************************************************************
params["Domain"] = "audiochat.hearme.com";
params["Vendor"] = "HEARME";
params["Application"] = "EVP";
params["Talklimit"] = "60000";
params["Width"] = "130";
params["Height"] = "180";
params["Border"] = "1";
params["Color"] = "#aaaaaa";
params["LogoImg"] = evp_root + "/images/hearme.gif";
params["LogoURL"] = root + "/products/";
params["HelpURL"] = root + "/products/vp/evp_help.html?version=" +
client_version + script_version;
// ****************************************************************
// ****************** READ PARAMETERS *************************
// ****************************************************************
if( document.HearMeVCC )
{
    for( i=0; i<document.HearMeVCC.length; i++ )
    {
        if( document.HearMeVCC[i].value != null )
            params[document.HearMeVCC[i].name] =
document.HearMeVCC[i].value;
    }
}
// ****************************************************************
// ****************** HARDCODED PARAMETERS ********************
// ****************************************************************
params["Domain"] = "audiochat.hearme.com";
params["Vendor"] = "HEARME";
params["Application"] = "EVP";
// ****************************************************************
// ****************** HTML CODE FOR CONTROL *******************
// ****************************************************************
document.write( "<TABLE WIDTH=", params["Width"] );
if( params["Border"] != "" )
    document.write( " BORDER=", params["Border"] );
if( params["Color"] != "" )
    document.write( " BGCOLOR=", params["Color"] );
document.write( "><TR><TD><TABLE BORDER=0><TR>");
document.writeln( "<TD ALIGN=LEFT><A HREF=", params["LogoURL"],
" TARGET=HEARME><IMG SRC=",
    params["LogoImg"], " BORDER=0></A></TD>" );
document.writeln( "<TD ALIGN=RIGHT><FONT SIZE=1 FACE=ARIAL><A
HREF=", params["HelpURL"],
    " TARGET=VP_HELP><B>HELP</B></A></FONT><BR>" );
document.writeln( "</TD></TR>" );
document.writeln("<TR><TD COLSPAN=2 ALIGN=CENTER>");
if( (navigator.appVersion.charAt(0) < 4) ||
    ((navigator.appName == "Netscape") &&
(navigator.appVersion.split(" ", 1) < 4.08)) )
{
    document.write("<TABLE><TD ALIGN=center BGCOLOR=white
```

-continued

```
WIDTH=",params["Width"]," HEIGHT=", params["Height"],">");
        document.writeln( "<font face=arial size=-1>To voice chat
with other users, ",
        "you must have Netscape 4.08 and above or Internet Explorer 4.0
and above",
        "</font>");
        document.write("</TD></TABLE>");
} else if( navigator.userAgent.indexOf( "Win" ) == -1 )
{
        document.write("<TABLE><TD ALIGN=center BGCOLOR=white
WIDTH=",params["Width"]," HEIGHT=",params["Height"],">");
        document.writeln("<font face=arial size=-1>To voice chat with
other users, ",
        "you must have a PC with Microsoft Windows installed",
        "</font>");
        document.write("</TD></TABLE>");
} else if( navigator.userAgent.indexOf( "MSIE 3" ) == -1 )
{
    if( navigator.appName == "Netscape" )
    {
        //
********************************************************
        // ****************** NETSCAPE EMBED TAG
**********************
        //
********************************************************
        document.write( "<EMBED NAME='EVP' ");
        document.writeln( "TYPE='", mimetype , ";version=",
client_version, "' " );
        document.writeln( "pluginurl='", ns_url, "'
pluginspage='' ");
        for( var i=0; i<params.length; i++ )
        {
        if( params[params[i]] != null )
            {
                document.write( " ", params[i], "='",
params[params[i]], "'" );
            }
        }
        document.write( " hosturl='", escape( document.URL), "'"
);
        document.writeln( "></EMBED>" );
    } else
    {
        //
********************************************************
        // ****************** MSIE OBJECT TAG
**********************
        //
********************************************************
        document.write( "<OBJECT ID='EVP' CLASSID='", classid, "'
CODEBASE='", ie_url,
                "' WIDTH='", params["Width"], "' HEIGHT='",
params["Height"], ">" );
        for( i=0; i<params.length; i++ )
        {
        if( params[params[i]] != null )
            {
                document.write( "<PARAM NAME='", params[i], "'
VALUE='", params[params[i]], "'></PARAM>" );
            }
        }
        document.writeln( "</OBJECT>" );
    }
    //
********************************************************
    // ****************** HTML CODE FOR MIC CONFIG
*****************
    //
********************************************************
    document.writeln("<FONT SIZE=1 FACE=ARIAL><A HREF='#' ",
        "onMouseOver=\"self.status='Configures your microphone and
speaker levels'; ",
        "return true\" onMouseOut=\"self.status=''; return
true\"",
        "onClick=\"window.open('", mic_url, "', 'vp_audio config',
",
```

-continued

```
        "'WIDTH=750, HEIGHT=800, resizable=yes, scrollbars=yes'
);\">",
        "Audio Configuration</A></FONT>");
}
document.writeln( "</TD></TR></TABLE></TD></TR></TABLE>" );
}
```

E-mail program 335 is an example of an invitation sending application 205. In an embodiment of the invention, the invitation 330 is also sent to an invitation manager 350. Invitation manager 350 categorizes outgoing invitations according to one or more attributes, such as recipient, date, or topic. Based on this categorization, invitation 330 is then stored in storage medium 355. Outgoing invitations can subsequently be displayed according to these attributes.

Figure 4:
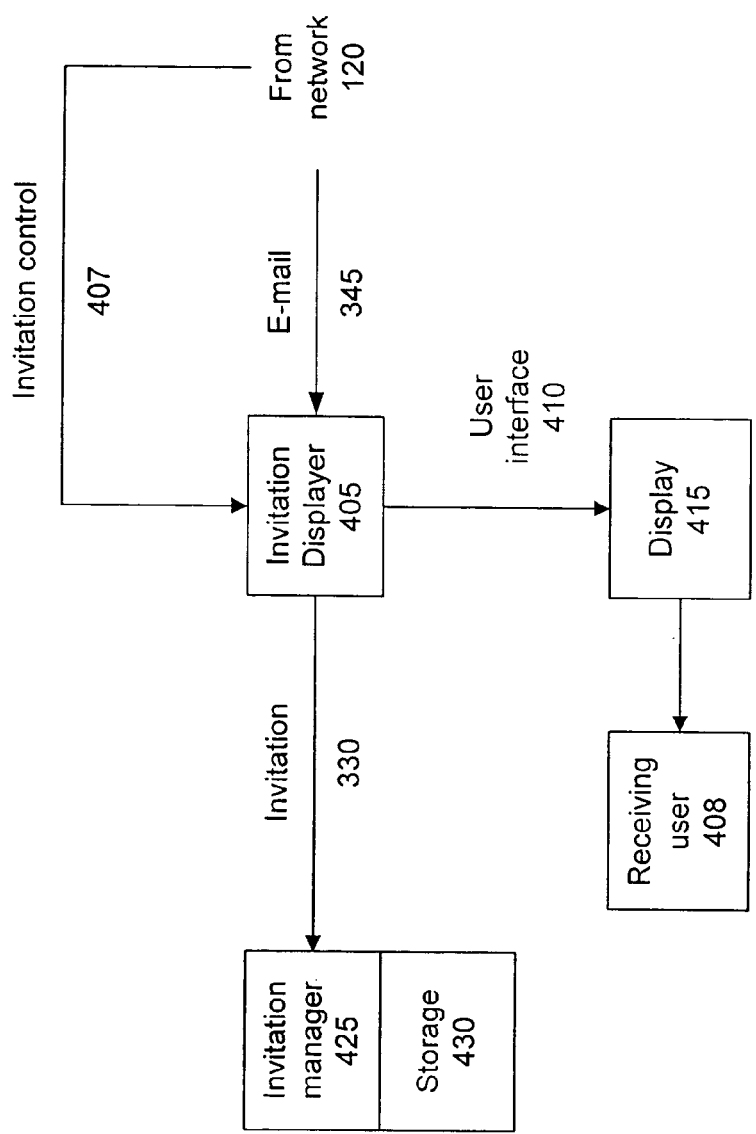
FIG. 4 is a block diagram illustrating the receipt and processing of an e-mail containing an invitation, according to an embodiment of the invention.

The portion of the system of the present invention that is incorporated at the receiving computer 115 is illustrated in FIG. 4. Receiving computer 115 receives e-mail 345 from the network 120. E-mail 345 is received by an invitation displayer 405. One example of an invitation displayer is a commercially available e-mail program, such as Microsoft's Outlook or Qualcomm's Eudora. Displayer 405 can then present a user interface 410 to a receiving user 408 through a display device 415, such as a computer monitor. The invitation 330 (embedded in e-mail 345) is also sent to an invitation manager 425. Invitation manager 425 filters and categorizes incoming invitations, such as invitation 330, according to one or more attributes, such as sender, date, or topic. Invitation 330 can then be stored appropriately in storage medium 430. Received invitations can subsequently be viewed according to category.

Note that in an embodiment of the invention, invitation 330 can only be displayed and accessed by the receiving user 408 if the receiving computer 115 has the current version of an invitation control 407. Invitation control 407 is an object that provides a visual display of invitation 330. In a preferred embodiment, invitation control 407 is downloaded by receiving computer 115 from a cooperating web server via network 120 and then embedded in e-mail 345, thereby making invitation 330 accessible to the receiving user through e-mail 345.

An example of a displayed invitation is shown in FIG. 10, which will be described in greater detail below.

Figure 5:
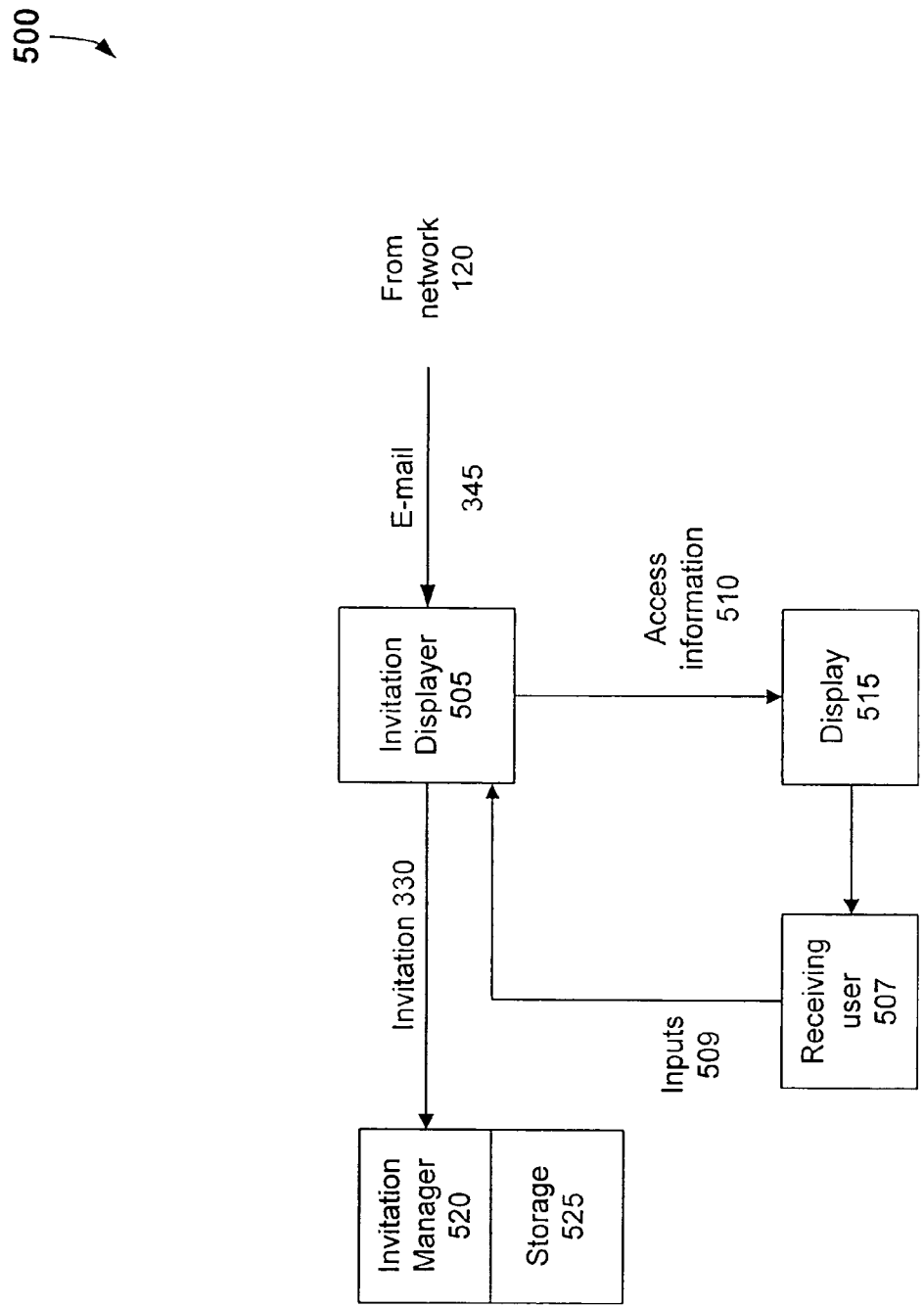
FIG. 5 is a block diagram illustrating the receipt and processing of an e-mail containing an invitation, according to an alternative embodiment of the invention.

In an alternative embodiment of the invention, a displayer (such as an e-mail program) may not be able to present an incoming invitation to the receiving user. This would be the case, for example, if the incoming e-mail is in HTML format and the e-mail program is incapable of supporting HTML. In such a case, an invitation control cannot be embedded in e-mail 345 so as to display application 330. Such an embodiment of the invention is illustrated in FIG. 5. Here the e-mail 345 is received by invitation displayer 505, through network 120. If displayer 505 is unable to present the invitation 330 to the receiving user 507, displayer 505 presents, instead, other information that permits the receiving user 507 to access the invitation 330. This information is identified in FIG. 5 as access information 510. In this embodiment, access information 510 constitutes an address or pointer to an invitation control. Access information 510 is conveyed to the user through display 515. Access information 510 may, for example, include a universal resource locator (URL). This enables the receiving user 507 to provide user inputs 509 allowing receiving user 507 to use a web browser to access a web server associated with the URL and, from there, download the necessary invitation control. Receiving user 507 provides the appropriate input 509, i.e., clicks on a hypertext link, or "hotlink" of the URL. The receiving user 507 can then download the invitation control.

The receiving user 507 can then access the invitation 330 through a browser window instead of through invitation displayer 505. An example of the script code that presents such a display is presented below, in PERL. This code is presented by way of example, and is not intended as a limitation on embodiments of the invention:

```
#!/usr/local/bin/perl
use Socket ;
use FileHandle ;
if($ENV{'REQUEST_METHOD'} eq "POST") {
    $post = <STDIN>;
    split_query ($post, \%query, 1);
}
else {
    split_query ($ENV{'QUERY_STRING'}, \%query, 1);
}
$message = << "EOM"
MIME-Version: 1.0
Content-Type: text/html; chartset=us-ascii; name="OfferMailTest"
<!DOCTYPE HTML PUBLIC "-//W3C/DTD HTML 4.0 Transitional//EN">
<html>
<head>
    <meta http-equiv="Content-Type" content="text/html;
charset=iso-8859-1">
</head>
<body bgcolor="#DDDDDD">
<!-------------- BEGIN HearMe Now Device Parameters --------------
>
```

```
<form name="HearMeVCC">
    <input type="hidden" name="Username" value="$query{'rec'}">
    <input type="hidden" name="Channel" value="#$query{'cha'}">
<!-------------- END HearMe Now Device Parameters -------------->
<!-------------- BEGIN HearMe Now Device Display -------------->
<table cellspacing=0 cellpadding=0 width=600>
<tr>
<td width=440 valign=top align=left>
Copyright 1999 HearMe. All rights reserved.
<td width=160 valign=top align=center>
<script language="JavaScript"
    src="http://www.hearme.com/products/vp/embedded/scripts/vc.js">
</script>
</table>
</form>
</body>
</html>
EOM
;
print $message ;
sub split_query
######################################################################

# Split a CGI QUERY_STRING into an associative array.
{
    local ($query_string, *query_dict, $escape) = @_;
    local (@query_list, $query_pair, $name, $value);
    @query_list = split (/&/, $query_string);
    foreach $query_pair (@query_list) {
        if ($query_pair =~ / ([^=]+)=(.*)$/) {
            $name = $1; $value = $2;
            if ($escape) {
                $value =~ s/ \+/ /g;
                $value =~ s/%([0-9A-Fa-f]{2})/pack('C', hex($1))/eg;
            }
            $query_dict{$name} = $value;
        }
    }
    $query_dict('_escape') = $escape;
    return 1;
}
```

The java script "vcjs" can be written as described earlier with respect to e-mail program 335.

As before, invitation 330 can be sent to an invitation manager 520. Invitation manager 520 filters and categorizes incoming invitations. Invitation 330 is then stored as appropriate in storage medium 525.

Method

Figure 6:
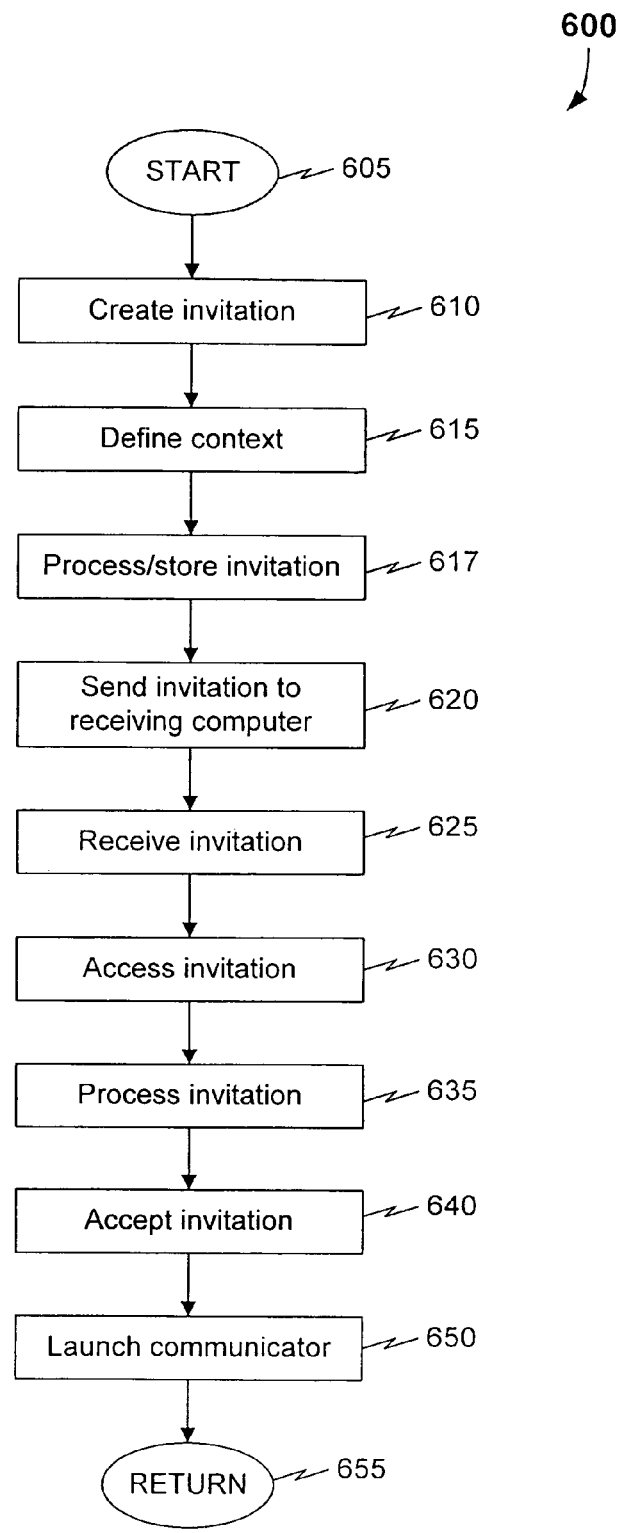
FIG. 6 is a flowchart showing the overall method of an embodiment of the invention.

The process of the invention is described in general in FIG. 6. Process 600 begins with step 605. In a step 610, the sending user creates an invitation. In an embodiment of the invention, the invitation is created using an invitation development module 305. In a step 615, the sending user defines the context for the invitation. Here, context refers to information that must be shared between a sending computer and receiving computer, so that the parties can communicate. Such context information can include, for example, a channel name which allows the parties to establish a connection.

In a step 617, the sending user can process the invitation, so as to store the invitation according to some categorization. The categorization may, for example, be defined so as to archive outgoing invitations in an organized manner. The invitations may, for example, be organized according to attributes of each invitation, such as the intended recipient, or the date on which the invitation was sent. Invitations can subsequently be displayed according to their category. In a step 620, the invitation is sent to the receiving computer. As described above, e-mail represents one vehicle by which the invitation can be sent.

In a step 625, the invitation is received by the receiving computer. In a step 630, the receiving user accesses the invitation. As described above with respect to FIGS. 4 and 5, the receiving user requires an invitation control before the invitation can be accessed. An invitation control is a control object that allows for visual display of an invitation. The invitation control can be downloaded from a web server, then embedded in the received e-mail. The receiving user may, alternatively, already have the invitation control from a previous interaction involving an invitation.

If the invitation control must be obtained, step 630 entails obtaining the invitation control. If the e-mail program of the receiving computer is capable of handling HTML, then the invitation control can be downloaded, then embedded in the received e-mail. If the e-mail program of the receiving computer is not capable of handling HTML, then the receiving user will be presented with a link to the cooperating web server from which the necessary invitation control can be downloaded. The invitation can then be accessed by the receiving user through a web page, using a web browser such as Internet Explorer by Microsoft.

In a step 635, the receiving user processes the received invitation so as to store the received invitation according to a categorization based on attributes of the invitation. In a step 640, the receiving user accepts the invitation. If the e-mail is in HTML format, this can be done through the user interface of invitation displayer 405, provided that displayer 405 is capable of handling HTML. Alternatively, the receiving user can accept the invitation by using a web site through which the invitation can be accessed. Accepting the invitation triggers an automatic download of invitation manager 425 and invitation communicator 236 (see FIG. 2), which are then installed at the receiving computer. In a step 650, the receiving user can launch communicator 236. This enables the receiving user to access any status information provided by the sending user, and/or permits the receiving user to engage in real time communications with the sending user now or at a future time. The process concludes with a step 655.

Figure 7:
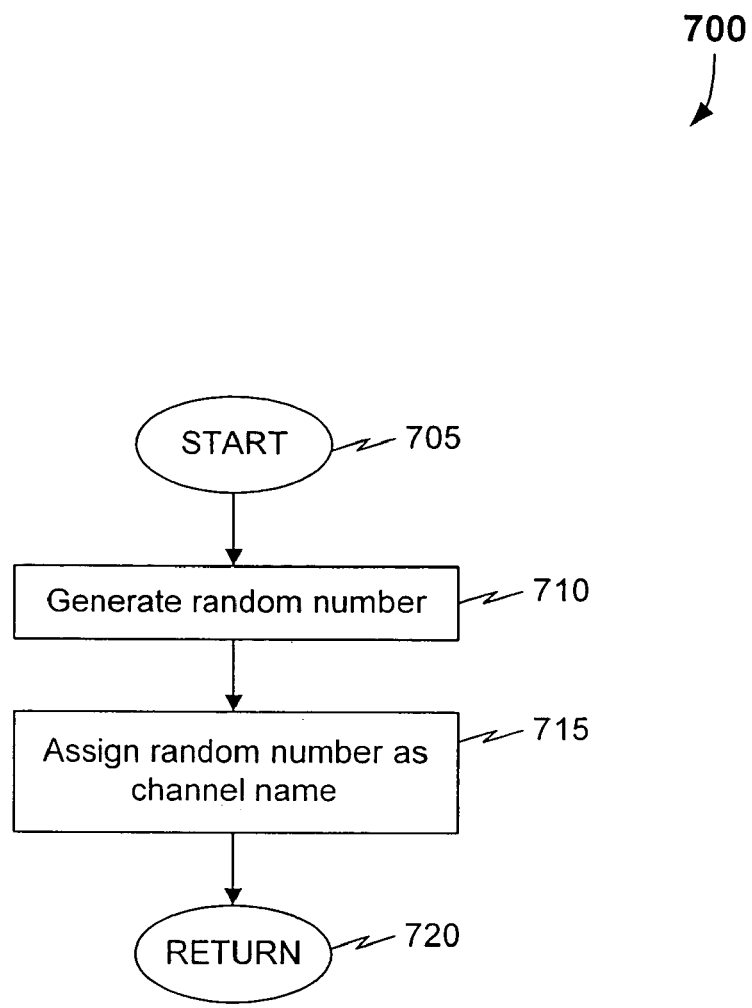
FIG. 7 is a flowchart showing the process of generating a channel name, according to an embodiment of the invention.

Context definition step 615 can include a process by which a channel is identified. The process for deriving a channel name, according to an embodiment of the invention, is illustrated in FIG. 7. The process begins with a step 705. In a step 710, a random number is generated. Such a random number can be generated, for example, by a generation module such as parameter generation module 325. In an embodiment of the invention, the random number can be generated by the PERL random number generator. In a step 715, the random number is mapped to a specific channel. The process concludes with a step 720. The generated random number can then be incorporated with the invitation which is then sent to the receiving user.

Figure 8:
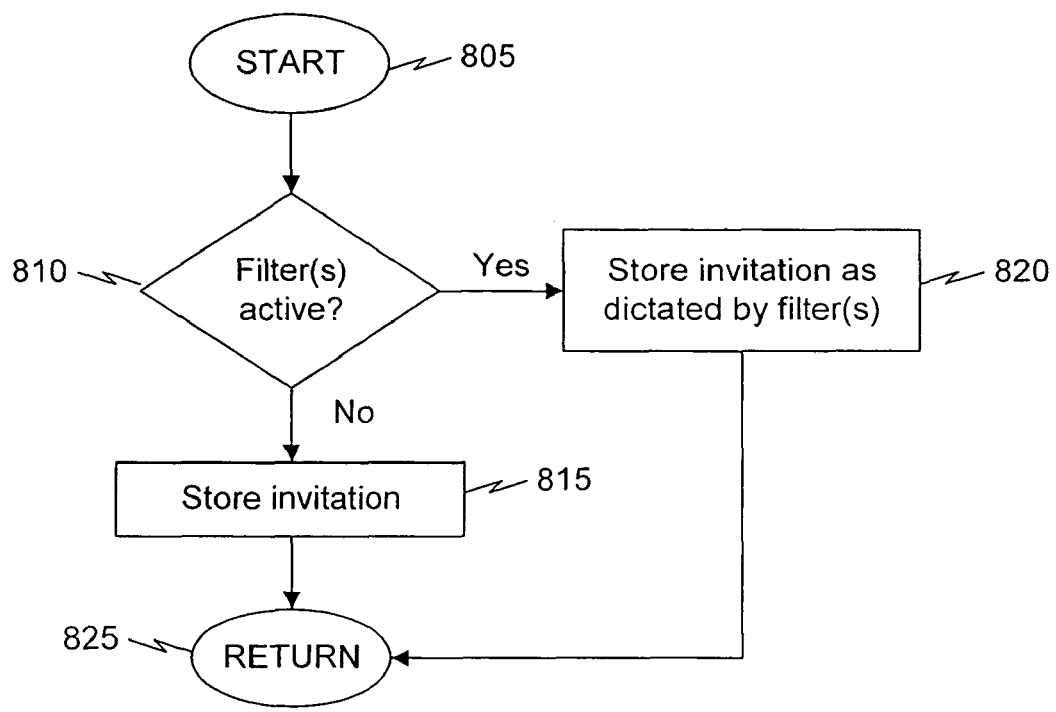
FIG. 8 is a flowchart showing the process of categorizing and storing an outgoing invitation, according to an embodiment of the invention.

The process of storing an invitation to be sent to a receiving user (step 617 of process 600) is illustrated in greater detail in FIG. 8. The process 617 begins with a step 805. In a step 810, a determination is made as to whether any filters are active, where such filters are used to categorize outgoing invitations according to attributes, such as topic and/or recipient. If no such filters are in place or active, then the process continues at a step 815. At step 815, the invitation is stored. If, however, one or more filters is active, as determined in step 810, then, in a step 820, the invitation is stored in a manner dictated by the active filter. The process ends at step 825. Invitations can subsequently be displayed according to their category.

Figure 9:
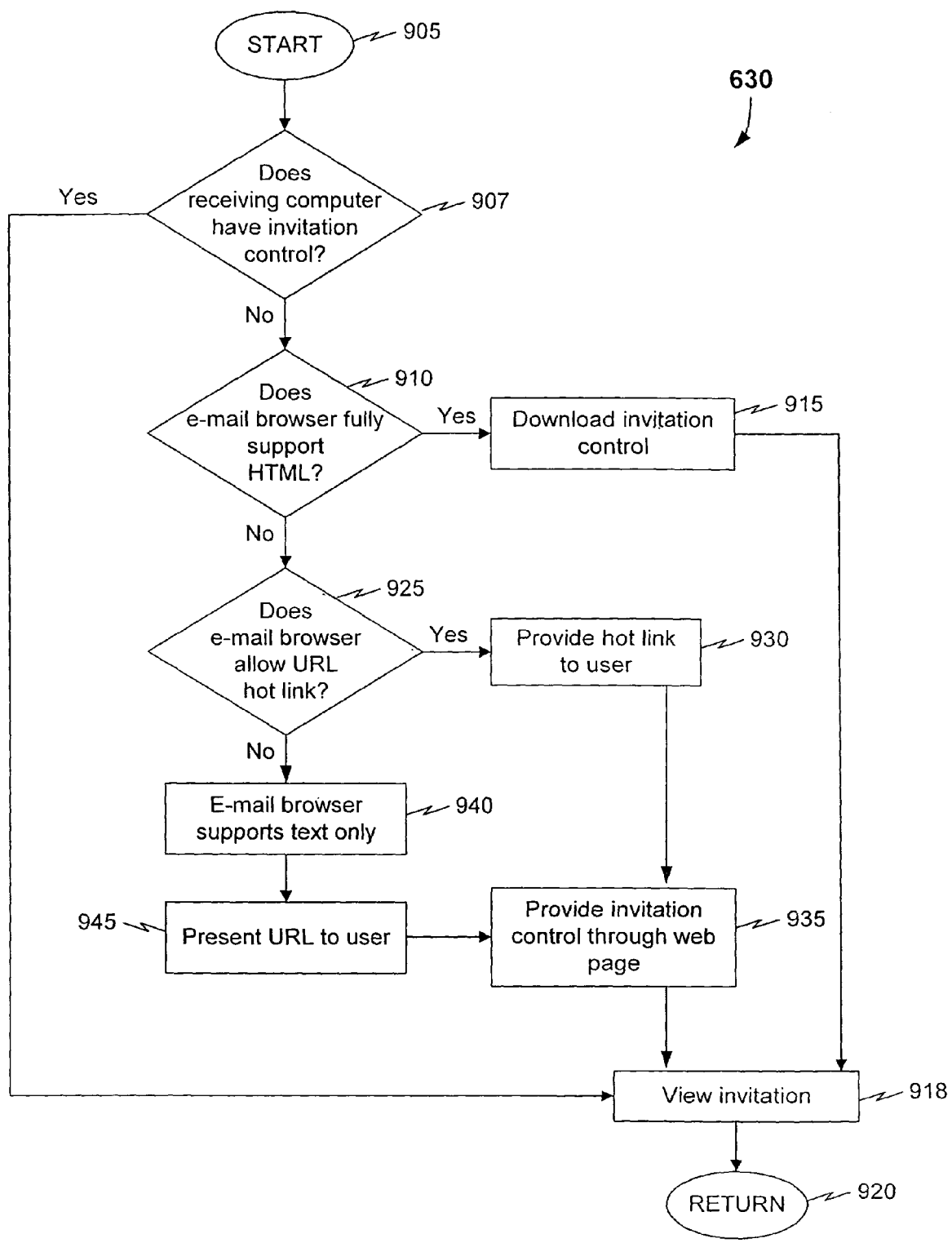
FIG. 9 is a flowchart showing the process of accessing a received invitation, according to an embodiment of the invention.

The step of accessing or using the invitation, step 630 of FIG. 6, is illustrated in greater detail in FIG. 9. The process begins with a step 905. In a step 907, a determination is made as to whether the receiving computer has the current version of the invitation control 407 (see FIG. 4). If so, then the invitation control can be used to view the invitation in a step 918. The invitation can be viewed within the e-mail, or through a web page interface if the e-mail program is not HTML-capable. If the receiving computer does not have the current version of the invitation control in step 907, the current invitation control must be obtained and the process continues at a step 910. In step 910, a determination is made as to whether the e-mail browser of the receiving computer can support HTML. If so, the process continues at a step 915, where the current invitation control is downloaded. In a step 918, the invitation is viewed by the receiving user. If, in step 910, the e-mail browser is found not to support HTML, then the process continues at a step 925. In step 925, a determination is made as to whether the e-mail program of the receiving user allows a URL hotlink. If so, then in a step 930, a hotlink is presented to the user in the received e-mail. The hotlink allows the receiving user to access a web server from which the current invitation control can be downloaded in a step 935. If, in step 925, the e-mail browser does not allow a URL hotlink, then in step 940 the e-mail browser must necessarily support text only. In a step 945, the user is presented with a textual reference to the URL, indicating the location of the appropriate web page from which the current invitation control can be downloaded. The receiving user can then use the URL to go to this web page. The download takes place in step 935. In step 918, the invitation is viewed by the receiving user. The process concludes with a step 920.

Figure 10A:
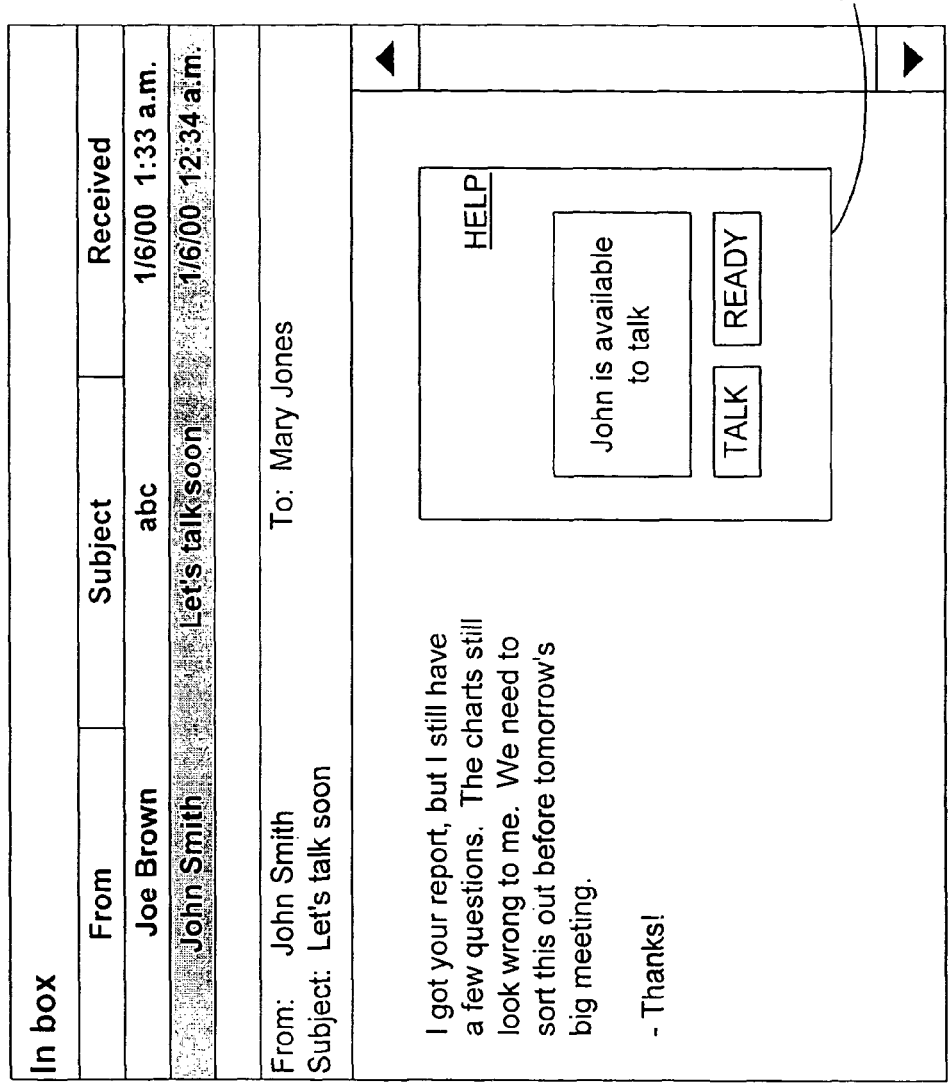
FIG. 10A is a screenshot of an e-mail with an embedded invitation control, according to an embodiment of the invention.
Figure 10B:
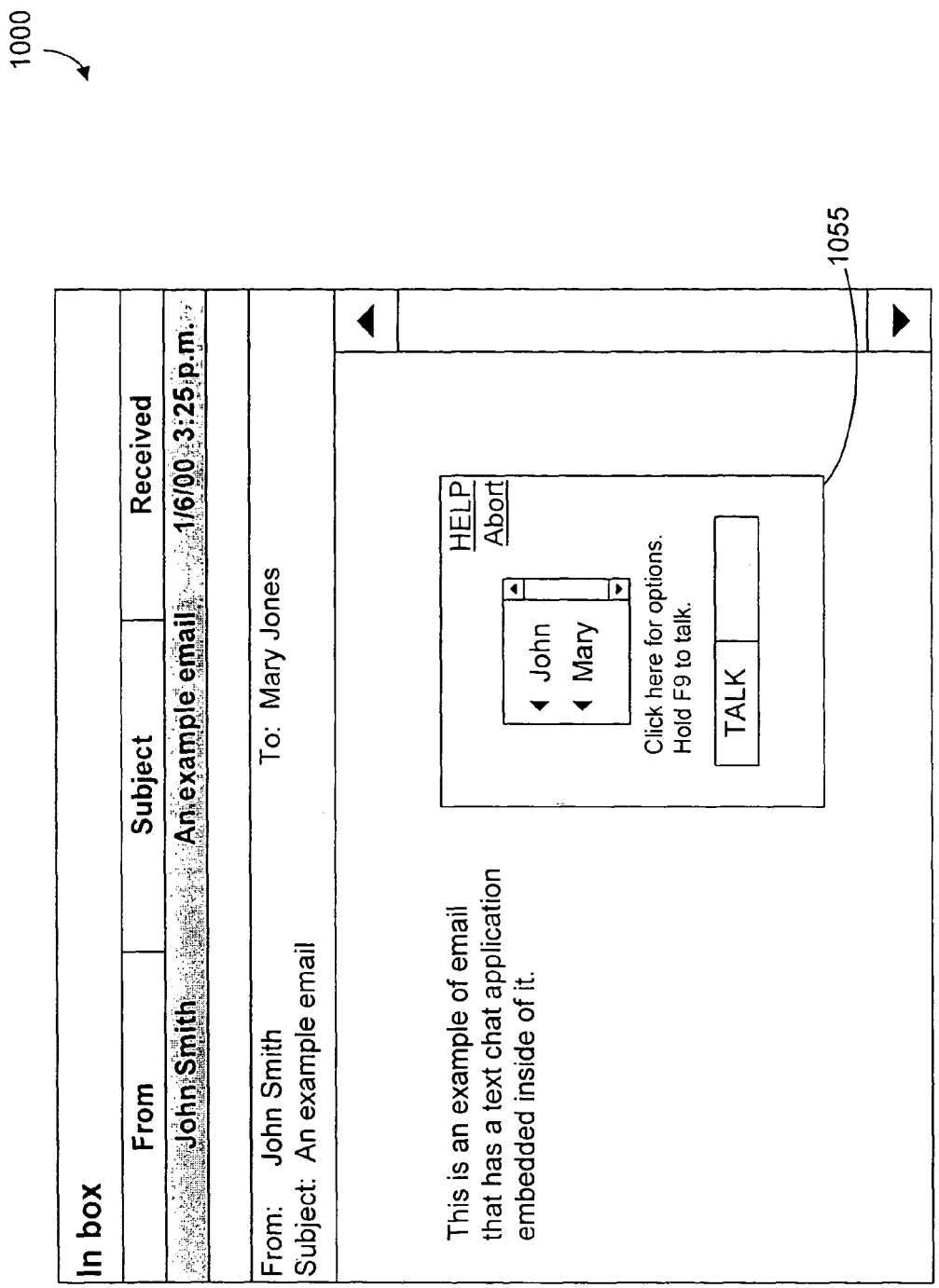
FIG. 10B is a screenshot of an e-mail with an embedded invitation communicator

If the e-mail browser of the receiving user can fully support HTML, then the user interface to the invitation is presented to the receiving user through the e-mail. An example of such a user interface as presented to a receiving user through an e-mail is illustrated in FIG. 10A. Here, the display 1000 includes an invitation control, displayed as interface 1005, through which the user can engage in real time communications. FIG. 10B shows a display 1050 with an interface 1055 to an invitation communicator application, with which the receiving user can communicate with other parties in real time.

Figure 11:
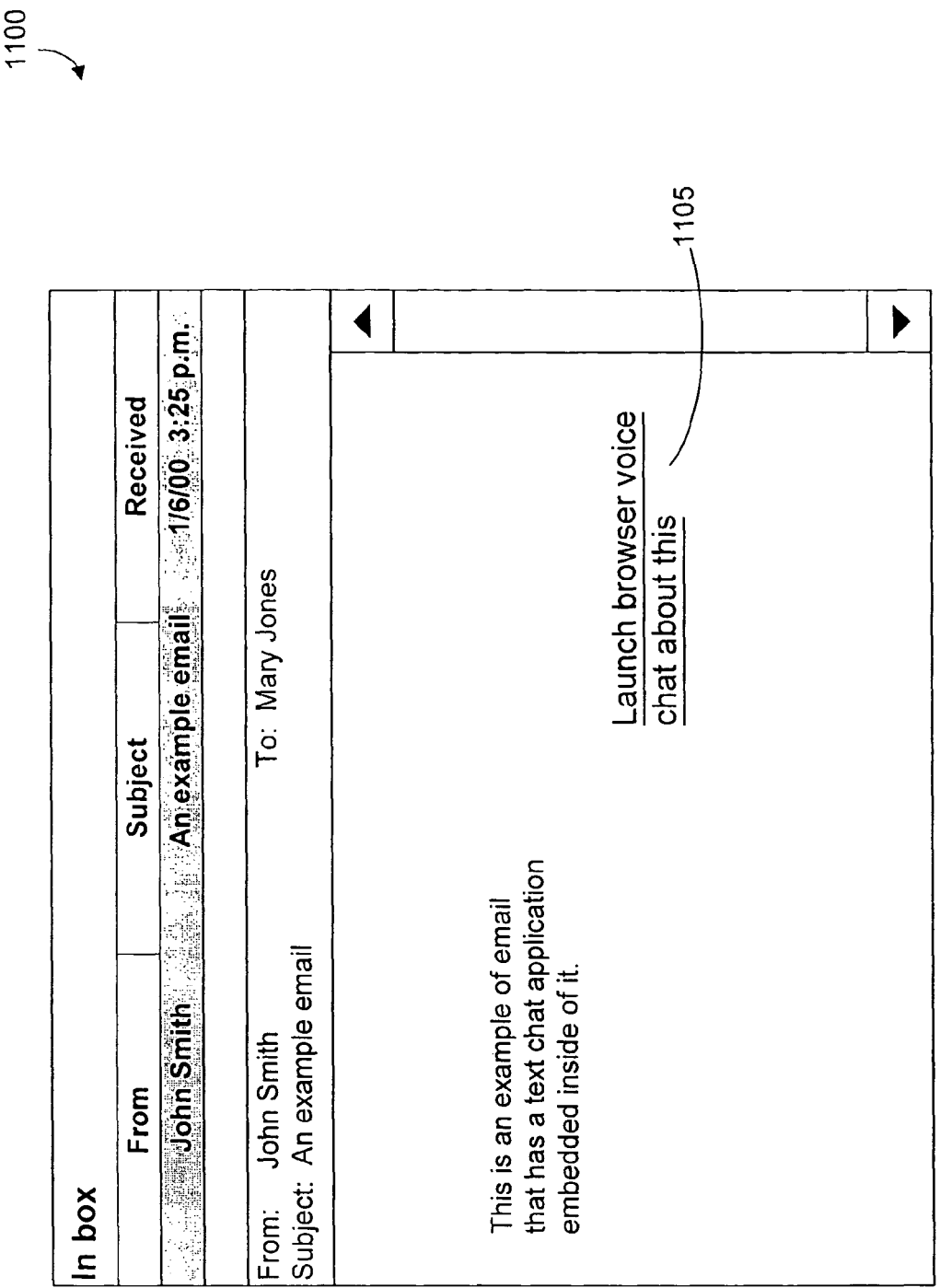
FIG. 11 is a screenshot of an e-mail with a hypertext link to web page from which an invitation control can be obtained and an invitation communicator launched, according to an embodiment of the invention.
Figure 12:
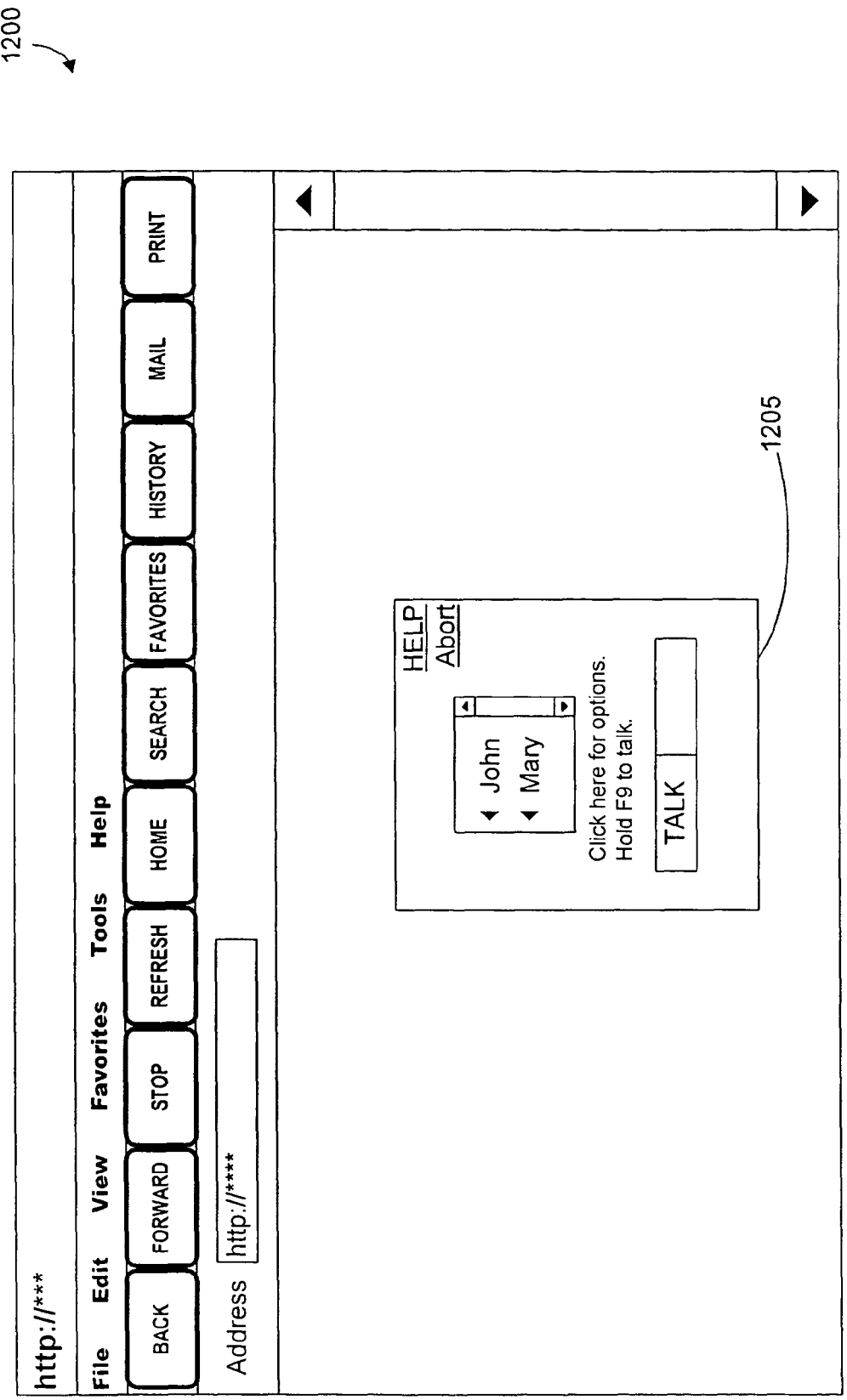
FIG. 12 shows a web page from which an invitation communicator can be launched, according to an embodiment of the invention.

If the e-mail browser of the receiving user is unable to fully support HTML, but does support a hotlink, then the hotlink is presented to the user through the e-mail. As described above, the web page associated with the hotlink provides the necessary invitation control which, in turn, allows access to the invitation and launching of the communicator. An illustration of an exemplary e-mail bearing such a hotlink is shown in FIG. 11. Here, display 1100 includes a hotlink 1105, which the receiving user can click to access the web page. An example of such a web page is illustrated in FIG. 12. Here, the web page 1200 includes a user interface 1205 to the invitation communicator application, with which the receiving user can communicate with other parties in real time.

Figure 13:
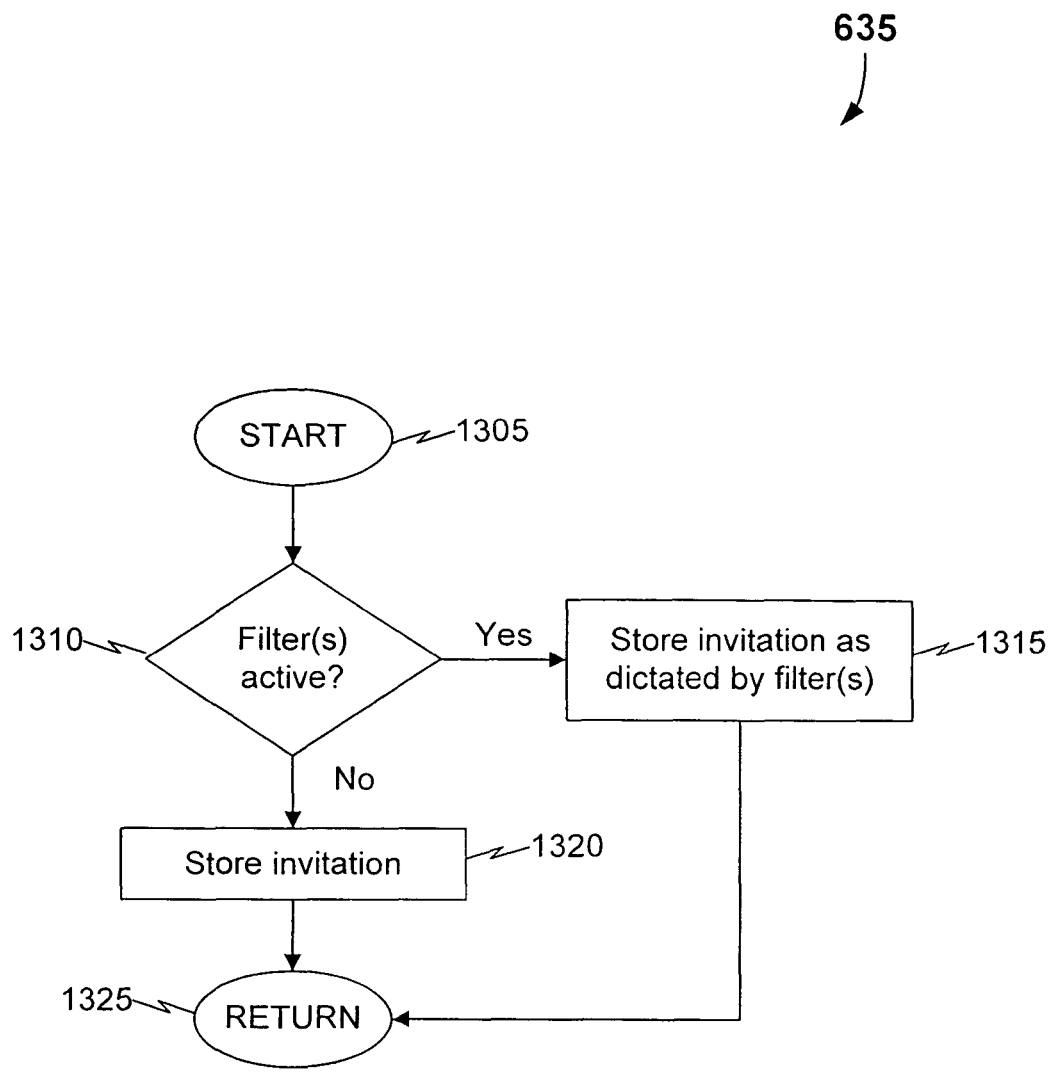
FIG. 13 is a flowchart showing the process of categorizing and storing a received invitation, according to an embodiment of the invention.

The step of processing the received invitation, step 635 of FIG. 6, is illustrated in greater detail in FIG. 13. The process begins with a step 1305. In a step 1310, a determination is made as to whether filters are in place and activated in the computer of the receiving user. If so, then in a step 1315, the invitation is stored in a manner dictated by the active filters, i.e., categorized. Invitations can subsequently be displayed according to their category. If, however, in step 1310, no filters are activated, then in a step 1320 the invitation is stored without any filtering taking place. In either event, the process concludes at a step 1325.

Figure 14:
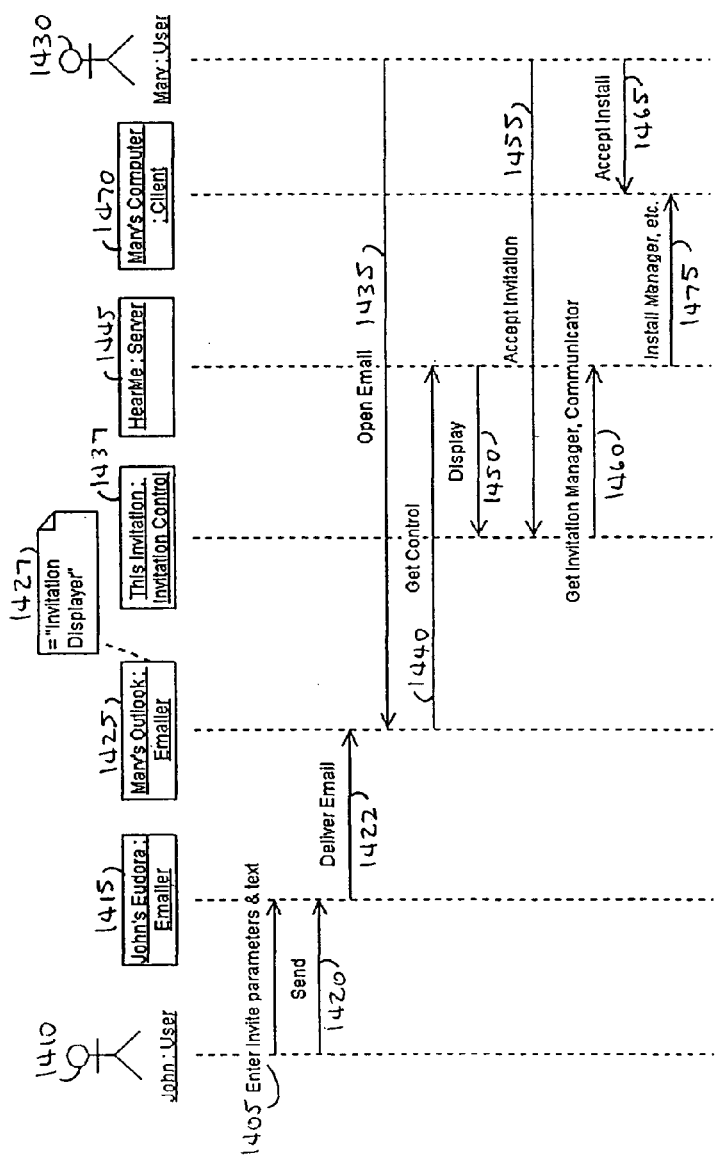
FIG. 14 is a timing diagram showing the process of transmitting an invitation to a receiving user who lacks a current invitation control, according to an embodiment of the invention.
Figure 15:
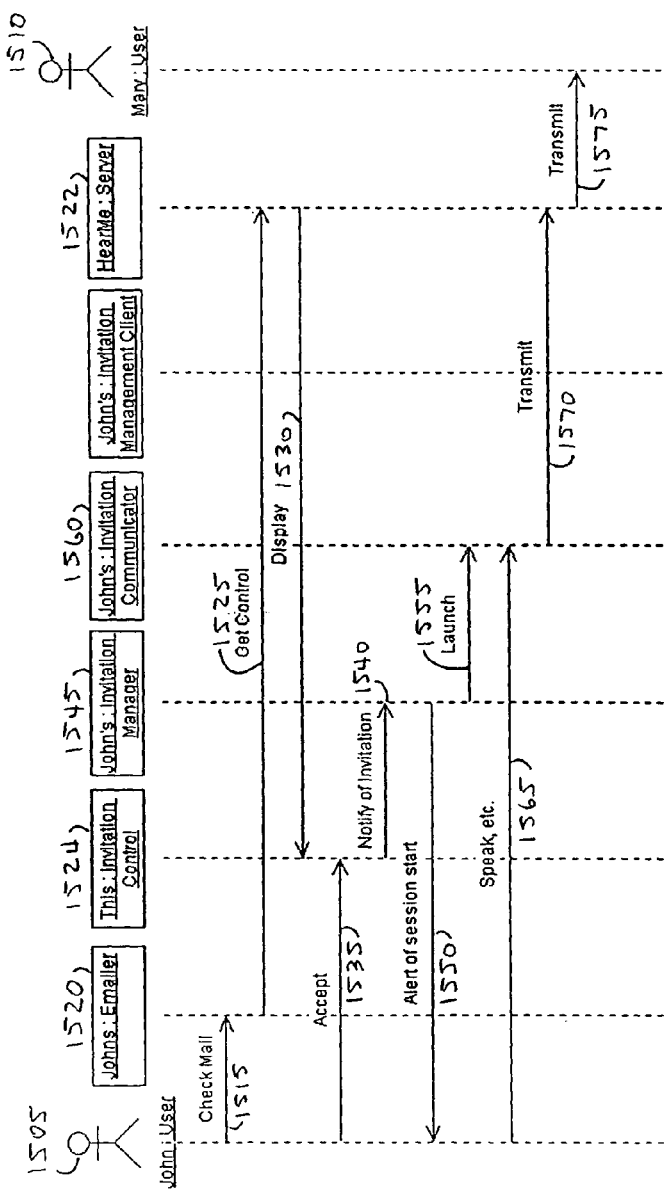
FIG. 15 is a timing diagram showing the process of receiving and accepting an invitation, launching an invitation communicator, and communicating, according to an embodiment of the invention.

The operation of an embodiment of the invention is further illustrated in the example scenarios of FIGS. 14 and 15. These scenarios illustrate the process of the invention as it relates to users and the components described above. In FIG. 14, a sending user John (1410) attempts to send an invitation to a receiving user Mary (1430), who lacks the current invitation control. In step 1405, sending user John sends an invitation, including the associated text and parameters, to his e-mail program 1415. In this embodiment, John's e-mail program 1415 is the Qualcomm product Eudora. In a step 1420, John tells e-mail program 1415 to send the invitation. E-mail program 1415 therefore represents an invitation sending application. In a step 1422, John's e-mail program 1415 delivers the invitation to the e-mail program 1425 of receiving user Mary, via standard mail protocols. In the embodiment illustrated, Mary's e-mail program is Outlook by Microsoft.

In a step 1435, Mary opens the e-mail containing the invitation. If she is using an HTML-capable e-mail reader, she can access the invitation by downloading the current invitation control 1437 from a web server such as a server supported by HearMe. The invitation control 1437 is then embedded in the e-mail. If she is using an e-mail reader not capable of displaying HTML, she will see a link to the invitation control 1437. By using this link, Mary can initiate a download of the invitation control 1437. In either case, this download is performed in a step 1440. This assumes that Mary grants privileges to any security dialog presented to her. The invitation control 1437 is automatically displayed in a step 1450, either as an embedded control within the e-mail or in a separate pop-up browser window if the e-mail reader is not capable of displaying HTML.

If Mary chooses to accept the invitation in a step 1455, a download of the invitation manager and an invitation communicator will be automatically requested from cooperating server 1445, such as one of HearMe's web servers, in a step

1460. If Mary chooses to accept the installation in a step 1465, she indicates acceptance to her computer 1470. In a step 1475, the installation is performed at computer 1470.

In FIG. 15, a scenario is depicted in which a receiving user John (1505) receives an invitation from a sending user Mary (1510) and ends up in a point-to-point chat session with Mary. This sequence can be logically extrapolated to include multiple receivers who all go through the same sequence of events and end up in a multi-user conference session.

In a step 1515, John checks his e-mail program 1520 and opens an e-mail containing an invitation. If John has never received an invitation on his machine or if there is a new version available on a web server 1522, the current invitation control 1524 is obtained in a step 1525. This step is similar to step 1440 described above. If John already has the invitation control and it is the current version, he will immediately see the invitation without any download.

In a step 1530, John views the invitation in his e-mail reader and, in a step 1535, accepts the invitation. This assumes that John's e-mail program is HTML-capable. In a step 1540, invitation control 1524 informs the invitation manager 1545 on John's machine that John has accepted the invitation. This causes the parameters of the invitation (such as the start time and the participants) to be copied into an invitation database managed by invitation manager 1545.

At the time specified in the invitation (which may be immediately), in a step 1550, invitation manager 1545 informs John that a communication session is about to start. In a step 1555, the invitation manager 1555 launches an invitation communicator 1560 to facilitate communication between the participants.

In the next series of steps, John communicates with Mary. In the case of voice communication, John's speech is passed to invitation communicator 1560 in a step 1565, then to server 1522 in a step 1570, then to Mary in a step 1575.

Computing Environment

Figure 16:
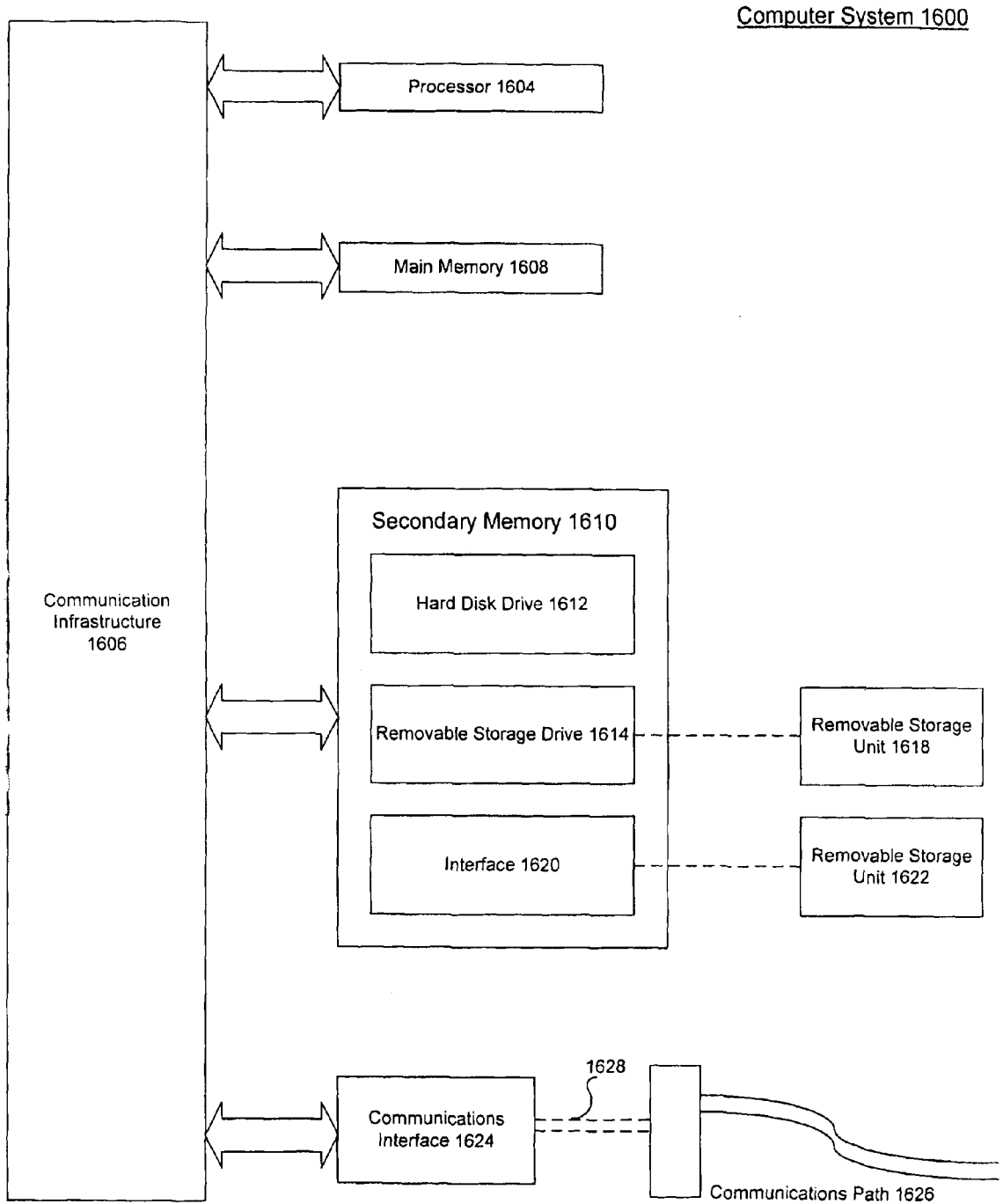
FIG. 16 illustrates a computing architecture on which the invention can be implemented, according to an embodiment of the invention.

Components of the present invention may be implemented using hardware, software or a combination thereof and may be implemented in a computer system or other processing system. An example of such a computer system 1600 is shown in FIG. 16. The computer system 1600 includes one or more processors, such as processor 1604. The processor 1604 is connected to a communication infrastructure 1606, such as a bus or network. Various software implementations are described in terms of this exemplary computer system. After reading this description, it will become apparent to a person skilled in the relevant art how to implement the invention using other computer systems and/or computer architectures.

Computer system 1600 also includes a main memory 1608, preferably random access memory (RAM), and may also include a secondary memory 1610. The secondary memory 1610 may include, for example, a hard disk drive 1612 and/or a removable storage drive 1614, representing a floppy disk drive, a magnetic tape drive, an optical disk drive, etc. The removable storage drive 1614 reads from and/or writes to a removable storage unit 1618 in a well known manner. Removable storage unit 1618, represents a floppy disk, magnetic tape, optical disk, or other storage medium which is read by and written to by removable storage drive 1614. As will be appreciated, the removable storage unit 1618 includes a computer usable storage medium having stored therein computer software and/or data.

In alternative implementations, secondary memory 1610 may include other means for allowing computer programs or other instructions to be loaded into computer system 1600. Such means may include, for example, a removable storage unit 1622 and an interface 1620. Examples of such means may include a program cartridge and cartridge interface (such as that found in video game devices), a removable memory chip (such as an EPROM, or PROM) and associated socket, and other removable storage units 1622 and interfaces 1620 which allow software and data to be transferred from the removable storage unit 1622 to computer system 1600.

Computer system 1600 may also include a communications interface 1624. Communications interface 1624 allows software and data to be transferred between computer system 1600 and external devices. Examples of communications interface 1624 may include a modem, a network interface (such as an Ethernet card), a communications port, a PCM-CIA slot and card, etc. Software and data transferred via communications interface 1624 are in the form of signals 1628 which may be electronic, electromagnetic, optical or other signals capable of being received by communications interface 1624. These signals 1628 are provided to communications interface 1624 via a communications path (i.e., channel) 1626. This channel 1626 carries signals 1628 and may be implemented using wire or cable, fiber optics, a phone line, a cellular phone link, an RF link and other communications channels.

In the context of an embodiment of a sending computer 105, signals 1628 comprise user inputs to e-mail module 335 and invitation development module 305. Such inputs may come from a keyboard or pointing device, such as a mouse. Signals 1628 also include parameters 320, which are required by invitation development module 305. Signals 1628 also comprise data produced by these modules, such as invitation 330 and e-mail 345. In the context of an embodiment of a receiving computer 115, signals 1628 comprise inputs to invitation displayer 405, such as e-mail 345 and invitation control 407. Signals 1628 also comprise data coming from invitation displayer 405, such as user interface 410.

In this document, the terms "computer program medium" and "computer usable medium" are used to generally refer to media such as removable storage units 1618 and 1622, a hard disk installed in hard disk drive 1612, and signals 1628. These computer program products are means for providing software to computer system 1600.

Computer programs (also called computer control logic) are stored in main memory 1608 and/or secondary memory 1610. Computer programs may also be received via communications interface 1624. Such computer programs, when executed, enable the computer system 1600 to implement the present invention as discussed herein. In particular, the computer programs, when executed, enable the processor 1604 to implement the present invention. Accordingly, such computer programs represent controllers of the computer system 1600. Where the invention is implemented using software, the software may be stored in a computer program product and loaded into computer system 1600 using removable storage drive 1614, hard drive 1612 or communications interface 1624. In an embodiment of the present invention, invitation development module 305, e-mail module 335, invitation displayer 405, and invitation mangers 350 and 425 are implemented in software and can therefore be made available to a processor 1604 through any of these means.

CONCLUSION

While various embodiments of the present invention have been described above, it should be understood that they have been presented by way of example, and not limitation. It will be apparent to persons skilled in the relevant art that various changes in detail can be made therein without departing from the spirit and scope of the invention. Thus the present invention should not be limited by any of the above-described exemplary embodiments, but should be defined only in accordance with the following claims and their equivalents.

What is claimed is:

1. A system for establishing real-time communications between computer users, the system comprising:
a first computer adapted to generate and send an invitation over a communication link, wherein said first computer determines a context to facilitate communication between said first computer and at least one second computer of said computer users, and wherein said invitation comprises data adapted to invoke an invitation communicator application in at least one second computer, wherein said invitation communicator application facilitates real-time communication between said first computer and said at least one second computer;
wherein said at least one second computer receives said invitation over said communication link,
wherein said at least one second computer determines whether said invitation is able to be displayed on said at least one second computer, wherein said at least one second computer receiving a Uniform Resource Locator (URL) regarding accessing and downloading an invitation control module for access to said invitation when said at least one second computer determines that said invitation is unable to be displayed on said at least one second computer,
wherein said at least one second computer provides a visual display of said invitation when said at least one second computer determines that said invitation is able to be displayed,
wherein said invitation downloads and embeds an invitation control module at said at least one second computer, and
wherein said invitation control module is embedded into said invitation when said at least one second computer does not have a current version of said invitation control module thereby making said invitation accessible to said second computer, and
wherein said invitation control module provides a visual display of said received invitation, and
wherein said URL is received through said communications link for access to said invitation if said invitation control module is not embedded in said invitation, and
wherein said invitation facilitates download of said invitation communicator application on said at least one second computer,
wherein said invitation automatically downloads and accesses said invitation communicator application upon selecting said invitation,
wherein said invitation communicator application facilitates a real-time peer-to-peer communication session between said first computer and said at least one second computer and provides a visual display of said communication,
wherein said determining a context comprises selecting a random number as a channel name.

2. The system of claim 1, wherein said first computer comprises: an invitation generation module for producing said invitation according to inputs of a first computer user; and,
an invitation sending application for accepting said invitation from said invitation generation module and for sending said invitation to a second computer user.

3. The system of claim 2, wherein said invitation sending application further comprises:

an email program that sends an email to said second computer user, wherein said email incorporates said invitation.

4. The system of claim 2, wherein said first computer further comprises:
a parameter generation module for generating parameters to be contained in said invitation and for automatically providing said parameters to said invitation generation module.

5. The system of claim 2, wherein said first computer further comprises:
an invitation manager for organizing and storing invitations according to one or more attributes of said invitations.

6. The system of claim 1, wherein said at least one second computer comprises:
an invitation displayer for displaying said invitation to a second computer user; and said invitation control module for enabling display of said invitation and for allowing access to said invitation.

7. The system of claim 6, wherein said invitation displayer comprises:
an email program for displaying said invitation.

8. The system of claim 6, wherein said at least one second computer further comprises:
an invitation manager for organizing and storing said invitation according to one or more attributes of said invitation.

9. The system of claim 1, wherein said invitation communicator application comprises:
an application selected from the group consisting of text chat, voice chat, real-time messaging, a bidding application associated with an auction, a buying application associated with an auction, a real-time purchasing application, and a reservation or ticket availability application.

10. The system of claim 1, further comprising: a voice server for facilitating voice communications between users of said first and second computers.

11. The system of claim 1, wherein said at least one second computer receives said invitation as one of an email file, an electronic document, or an electronic file.

12. A method for automatically establishing electronic communication between a first computer and at least one second computer connected by a communications network, the method comprising the steps of:
creating, by said first computer, an invitation that proposes a real-time communications session, and wherein, the invitation adapted to contain data capable of invoking an invitation communicator application in said at least one second computer, and said invitation further adapted to provide parameters to configure said invitation communicator application and adapted to facilitate real-time communication between said first computer and said at least one second computer;
determining a context to be shared by said first and said at least one second computer; and
sending said invitation from said first computer to said at least one second computer over a communication link; and
determining, by said at least one second computer, whether said invitation is able to be displayed on said at least one second computer, wherein said at least one second computer receives a URL regarding accessing and downloading an invitation control module for access to said invitation when said at least one second computer determines that said invitation is unable to be displayed on said at least one second computer, wherein said determining a context comprises selecting a random number as a channel name, and wherein the invitation embeds an invitation control module at said at least one second computer, wherein the invitation control module is embedded into the invitation when the at least one second computer does not have a current version of the invitation control module and when said at least one second computer determines that said invitation is able to be displayed on said at least one second computer thereby making the invitation accessible to said second computer, and wherein the invitation control module provides a visual display of the received invitation, the invitation control module facilitates download of the invitation communicator application, wherein said invitation automatically downloads and accesses said invitation communicator application upon selecting said invitation, and wherein the invitation communicator application establishes a real-time peer-to-peer communication session between the first computer and the at least one second computer, wherein said invitation communicator application provides a visual display of said communication.

13. The method of claim 12, further comprising the steps of:

receiving said invitation at said at least one second computer;

accepting said invitation; and invoking said invitation communicator application to automatically apply said context and establish said real-time communications session.

14. The method of claim 13, further comprising the step of downloading an invitation control module, performed after said receiving step.

15. The method of claim 14, wherein said downloading step is performed automatically.

16. The method of claim 14, wherein said downloading step is performed by invoking a hypertext link to a webpage from which said invitation control module can be obtained.

17. The method of claim 14, wherein said downloading step is performed by entering, into a web browser, a reference to a webpage from which said invitation control module can be obtained.

18. The method of claim 13, further comprising the following steps, performed after said receiving step:

filtering said invitation according to one or more attributes of the invitation;

associating said invitation with a category based on said filtering; and saving said invitation according to its associated category.

19. The method of claim 18, further comprising the following step, performed after the saving step:

displaying a representation of said received invitation according to its associated category.

20. The method of claim 12, wherein the communications network comprises the Internet.

21. The method of claim 12, further comprising the steps of:

storing said invitation at said first computer, performed after said creation step.

22. The method of claim 21, further comprising the step of:

displaying a representation of said invitation according to one or more attributes of said invitation, performed after said storing step.

23. The method of claim 12, wherein said invitation communicator application permits real-time voice communications between a user of said first computer and a user of said at least one second computer.

24. The method of claim 12, wherein said parameters comprise context information created in said context determination step.

25. The method of claim 24, wherein the context information comprises a channel name.

26. The method of claim 12, wherein said sending step comprises sending an email message containing said invitation.

27. The method of claim 12, wherein said sending step comprises sending an electronic file containing said invitation.

28. The method of claim 27, wherein said electronic file comprises an electronic document containing said invitation.

29. The method of claim 12, wherein said sending step comprises sending a computer-readable medium containing said invitation.

30. The method of claim 12, wherein said invitation communicator application delivers status information.

31. The method of claim 30, wherein said status information comprises information on the availability of a resource.

32. The method of claim 31, wherein said information on the availability of a resource comprises an indication of the presence and availability of a user of said first computer.

33. The method of claim 12, wherein said invitation communicator application delivers a conference address and a conference program.

34. The method of claim 12, wherein said first computer sends said invitation as one of an email file, an electronic document, or an electronic file.

35. A computer program product comprising a non-transitory computer usable medium having computer readable program code means embodied in said medium for causing a program to execute on a first computer that establishes a real-time communications session between said first computer and at least one second computer connected by a communications network, said computer readable program code means comprising:

a first computer program product for causing said first computer to create an invitation that proposes said real-time communications session, said invitation being embedded in an email file, and wherein said invitation containing parameters to configure an invitation communicator application in said at least one second computer, and said invitation adapted to contain at least one embedded invitation control to invoke said invitation communicator application and to provide said parameters to said invitation communicator application in response to a selection of said control by a user of said second computer, and wherein said invitation comprises information regarding accessing and downloading said invitation control module through said communications link for access to said invitation if said invitation control module is not embedded in said email file;

a second computer program product for causing said first computer to determine a context to be shared by said first computer and said at least one second computer for facilitating communications between said first computer and said at least one second computer; and a third computer program product for causing said first computer to send said invitation from said first computer to said at least one second computer over said communications network; wherein determining a context comprises selecting a random number as a channel name, wherein the email file embeds the invitation control module at the second computer if the at least one second computer does not have a current version of the invitation control module, and wherein the invitation control module comprises a visual display of the invitation, wherein said at least one second computer determines whether said invitation is able to be displayed on said at least one second computer, wherein said at least one second computer receives a URL regarding accessing and downloading an invitation control module that said second computer may display when said at least one second computer determines that said invitation is unable to be displayed on said at least one second computer, wherein said received invitation control module facilitates access to said invitation, said invitation comprising data for accessing and downloading said invitation communicator application for facilitating a peer-to-peer communication between said at least one second computer and said first computer, wherein said invitation automatically downloads said invitation communicator application upon selecting said invitation, and wherein said invitation communicator application provides a visual display of said communication.

36. A computer program product comprising a non-transitory computer usable medium having computer readable program code means embodied in said medium for causing a program to execute on a first computer that establishes a real-time communications session between said first computer and at least one second computer connected by a communications network, said computer readable program code means comprising:

a first computer program product for causing said first computer to send an invitation that proposes said real-time communication session, wherein said invitation is embedded in an email file, and wherein said invitation containing parameters to configure an invitation communicator application, said invitation adapted to contain at least one embedded invitation control, wherein said invitation includes comprises information regarding accessing and downloading said invitation control module through said communications link for access to said invitation if said invitation control module is not embedded in said email file;

a second computer program product for causing said at least one second computer to accept said invitation and for causing said first computer to determine a context to be shared by said first computer and said at least one second computer; and a third computer program product for causing said second computer to invoke said invitation communicator application in response to a user selection of said invitation control;

wherein determining a context comprises selecting a random number as a channel name, and wherein the email file embeds the invitation control module at the second computer if the at least one second computer does not have a current version of the invitation control module, and wherein the invitation control module comprises a visual display of the invitation, wherein said at least one second computer determines whether said invitation is able to be displayed on said at least one second computer, wherein said at least one second computer converts receives a URL that said second computer may display when said at least one second computer determines that said invitation is unable to be displayed on said at least one second computer, wherein said received URL facilitates downloading said invitation control for accessing said invitation, said invitation comprising data for accessing and downloading said invitation communicator application for facilitating a peer-to-peer communication between said at least one second computer and said first computer, wherein said invitation automatically downloads said invitation communicator application upon selecting said invitation, and wherein said invitation communicator application provides a visual display of said communication.

* * * * *